US012477386B2

(12) United States Patent
Chun et al.

(10) Patent No.: US 12,477,386 B2
(45) Date of Patent: Nov. 18, 2025

(54) MEDIA DATA REPORTING

(71) Applicant: Ofinno, LLC, Reston, VA (US)

(72) Inventors: SungDuck Chun, Fairfax, VA (US);
Kyungmin Park, Vienna, VA (US);
Esmael Hejazi Dinan, McLean, VA (US); Jian Xu, McLean, VA (US);
Peyman Talebi Fard, Vienna, VA (US);
Stanislav Filin, Chantilly, VA (US);
Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/194,550

(22) Filed: Apr. 30, 2025

(65) Prior Publication Data

US 2025/0261037 A1    Aug. 14, 2025

Related U.S. Application Data

(63) Continuation of application No. PCT/US2023/036097, filed on Oct. 27, 2023.

(60) Provisional application No. 63/421,907, filed on Nov. 2, 2022.

(51) Int. Cl.
*H04W 28/02* (2009.01)
*H04W 28/24* (2009.01)

(52) U.S. Cl.
CPC ....... *H04W 28/0268* (2013.01); *H04W 28/24* (2013.01)

(58) Field of Classification Search
CPC ............................ H04W 28/24; H04W 28/0268
See application file for complete search history.

(56) References Cited

U.S. PATENT DOCUMENTS

2020/0112907 A1    4/2020   Dao et al.
2024/0056888 A1*   2/2024   Tonesi ................. H04W 28/24

FOREIGN PATENT DOCUMENTS

| CN | 117279032 A    | 12/2023 |
| WO | 2022/212440 A1 | 10/2022 |
| WO | 2023/146584 A1 | 8/2023  |
| WO | 2023245582 A1  | 12/2023 |
| WO | 2024/027942 A1 | 2/2024  |

OTHER PUBLICATIONS

3GPP TS 23.501 V17.6.0 (Sep. 2022); Technical Specification; 3rd Generation Partnership Project; Technical Specification Group Services and System Aspects; System architecture for the 5G System (5GS); Stage 2; (Release 17).
3GPP TS 23.502 V17.6.0 (Sep. 2022); Technical Specification; 3rd Generation Partnership Project; Technical Specification Group Services and System Aspects; Procedures for the 5G System (5GS); Stage 2; (Release 17).

(Continued)

*Primary Examiner* — Gbemileke J Onamuti
(74) *Attorney, Agent, or Firm* — Sachin Kandhari; Kavon Nasabzadeh; Jacob L. Mangan

(57) ABSTRACT

A base station sends a report message of a data flow comprising a plurality of protocol data unit (PDU) sets, wherein the report message indicates at least one of the data flow not being fulfilled or a fulfilled alternative quality of service (QoS) parameter set indicating at least one of a PDU set error rate (PSER) or a PDU set delay budget (PSDB).

20 Claims, 28 Drawing Sheets

(56) References Cited

OTHER PUBLICATIONS

3GPP TS 23.503 V17.6.0 (Sep. 2022); Technical Specification; 3rd Generation Partnership Project; Technical Specification Group Services and System Aspects; Policy and charging control framework for the 5G System (5GS); Stage 2; (Release 17).
3GPP TR 23.700-60 V1.2.0 (Oct. 2022); Technical Report; 3rd Generation Partnership Project; Technical Specification Group Services and System Aspects; Study on XR (Extended Reality) and media services; (Release 18).
3GPP TS 24.501 V18.0.1 (Sep. 2022); Technical Specification; 3rd Generation Partnership Project; Technical Specification Group Core Network and Terminals; Non-Access-Stratum (NAS) protocol for 5G System (5GS); Stage 3; (Release 18).
3GPP TS 38.300 V17.2.0 (Sep. 2022); Technical Specification; 3rd Generation Partnership Project; Technical Specification Group Radio Access Network; NR; NR and NG-RAN Overall Description; Stage 2; (Release 17).
3GPP TS 38.322 V17.1.0 (Jun. 2022); Technical Specification; 3rd Generation Partnership Project; Technical Specification Group Radio Access Network; NR; Radio Link Control (RLC) protocol specification; (Release 17).
3GPP TS 38.323 V17.2.0 (Sep. 2022); Technical Specification; 3rd Generation Partnership Project; Technical Specification Group Radio Access Network; NR; Packet Data Convergence Protocol (PDCP) specification; (Release 17).
3GPP TS 38.413 V17.2.0 (Sep. 2022); Technical Specification; 3rd Generation Partnership Project; Technical Specification Group Radio Access Network; Ng-Ran; Ng Application Protocol (NGAP); (Release 17).
3GPP TS 38.425 V17.1.0 (Sep. 2022); Technical Specification; 3rd Generation Partnership Project; Technical Specification Group Radio Access Network; NG-RAN; NR user plane protocol; (Release 17).
3GPP TS 38.473 V17.2.0 (Sep. 2022); Technical Specification; 3rd Generation Partnership Project; Technical Specification Group Radio Access Network; NG-RAN; F1 application protocol (F1AP); (Release 17).
S2-2206001; 3GPP SA WG2 Meeting #152E; Aug. 17-26, 2022, Elbonia; Source: OPPO; Title: KI#4, Sol#15,52: update to generate PDU Set related info based on existing RTP; Document for: Approval; Agenda Item: 9.19; Work Item / Release: FS_XRM / Rel-18.
S2-2206210; SA WG2 Meeting #152E (e-meeting); Aug. 17-26, 2022, Elbonia (revision of S2-xxxxxxx); Source: Tencent, Tencent Cloud; Title: KI#4, sol#23, solution update; Document for: Approval; Agenda Item: 9.19; Work Item / Release: FS_XRM /Rel-18.
S2-2206216; SA WG2 Meeting #152E (e-meeting); Aug. 17-26, 2022, Elbonia (revision of S2-xxxxxxx); Source: Tencent, Tencent Cloud; Title: KI#4, New solution on PDU set handling enhancements for different kinds of packets; Document for: Approval; Agenda Item: 9.19; Work Item / Release: FS_XRM /Rel-18.
S2-2206231; 3GPP TSG-WG SA2 Meeting #152E e-meeting ;Elbonia, Aug. 17-26, 2022 (revision of S2-220xxxx); Source: Huawei, HiSilicon; Title: Update of Sol#52 on EN Resolving and solution supplement; Document for: Approval; Work Item / Release: FS_XRM/ Rel-18.
S2-2206284; TSG SA WG2 Meeting #152E; Aug. 17-26, 2022, Electronic meeting; Source: Lenovo; Title: Key Issues #4 and #5: update of Solution #52 ; Document for: Approval; Agenda Item: 9.19; Work Item / Release: FS_XRM/ Rel-18.
S2-2206328; 3GPP TSG-WG SA2 Meeting #152E e-meeting; Elbonia, Aug. 17-26, 2022 (revision of S2-220xxxx); Source: Huawei, HiSilicon; Title: Update on Solution#53 PDU Set transmission coordination between RAN and UPF; Document for: Approval; Agenda Item: 9.19; Work Item / Release: FS_XRM / Rel-18.
S2-2206514; 3GPP TSG-WG SA2 Meeting #152E e-meeting; Elbonia, Aug. 17-26, 2022 (revision of S2-220xxxx); Source: Xiaomi; Title: FS_XRM K#4#5 Sol#52 Update with Charging Offset; Document for: Approval; Agenda Item: 9.19; Work Item / Release: FS_XRM / Rel-18.
S2-2206663; 3GPP TSG-WG SA2 Meeting #152E e-meeting; Elbonia, Aug. 17-26, 2022 (revision of S2-220xxxx); Source: ZTE; Title: FS_XRM KI#4&5 Solution 52 update; Document for: Approval; Agenda Item: 9.19; Work Item / Release: FS_XRM / Rel-18.
S2-2206785; 3GPP SA WG2 Meeting #152E; e-meeting, Aug. 17-26, 2022; Source: Google Inc.; Title: Sol#52 Update for PDU Set based QoS framework; Document for: Approval; Agenda Item: 9.19; Work Item / Release: FS_XRM / Rel-18.
International Search Report and Written Opinion of the International Searching Authority mailed Feb. 5, 2024, in International Application No. PCT/US2023/036097.
3GPP TR 23.700-60 V0.3.0 (May 2022); Technical Report; 3rd Generation Partnership Project; Technical Specification Group Services and System Aspects; Study on XR (Extended Reality) and media services; (Release 18).
R2-2209937; 3GPP TSG-RAN WG2 Meeting #119bis electronic; Online, Oct. 10-Oct. 19, 2022; Agenda item: 8.5.2.1; Source: Lenovo; Title: Discussion on PDU sets and data burst awareness in RAN; Document for: Discussion and Decision.

\* cited by examiner

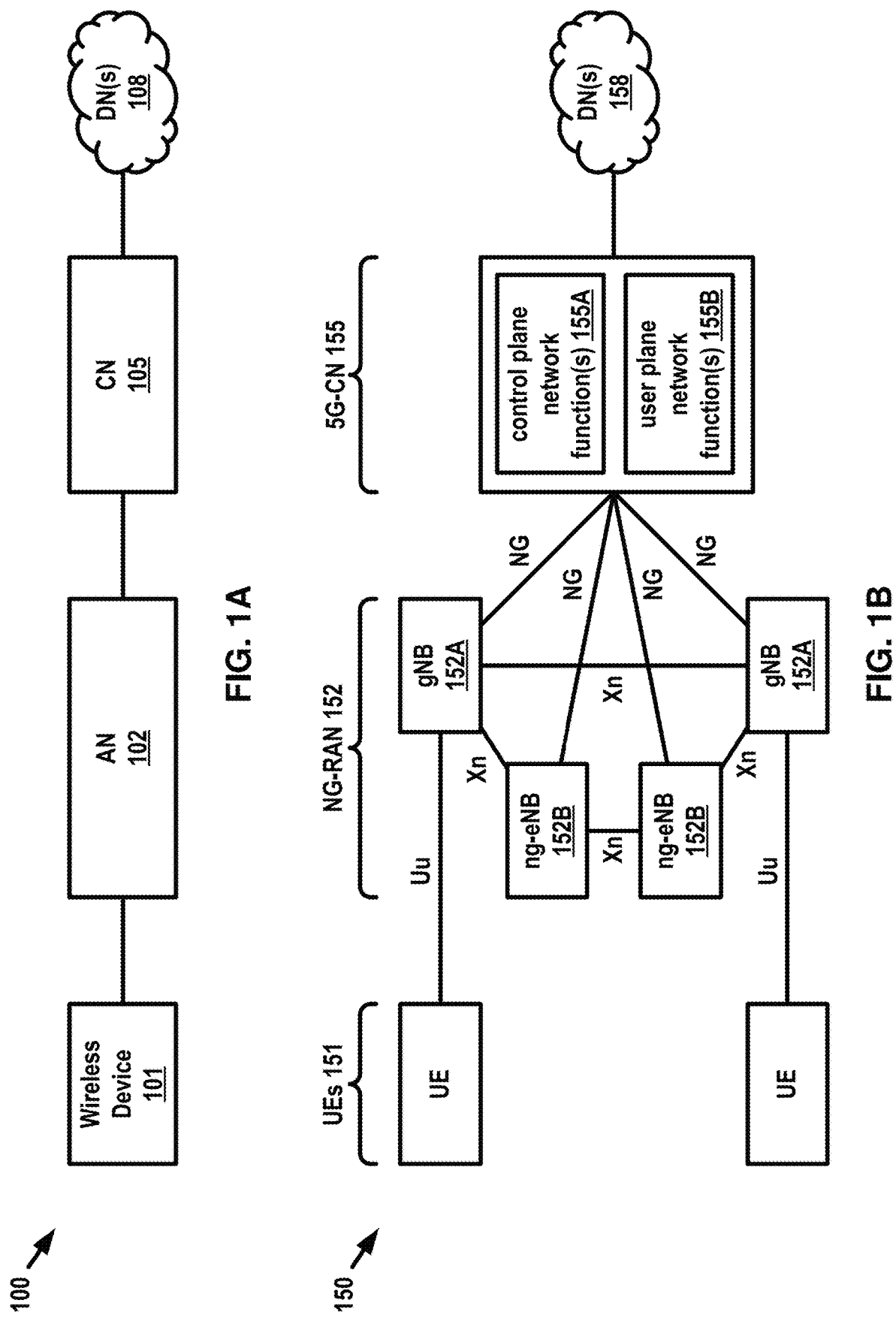

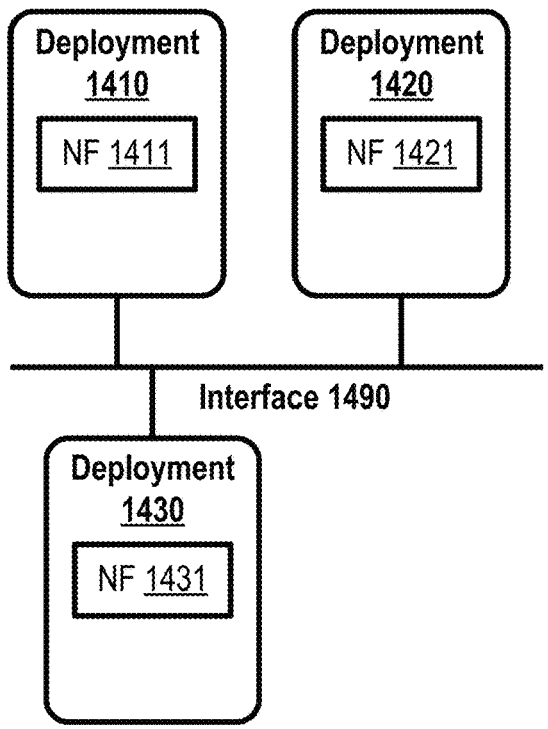
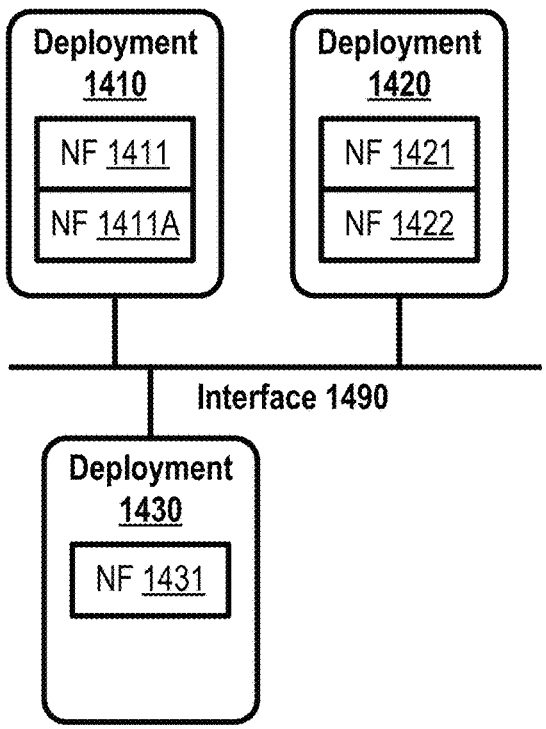
FIG. 14A
FIG. 14B
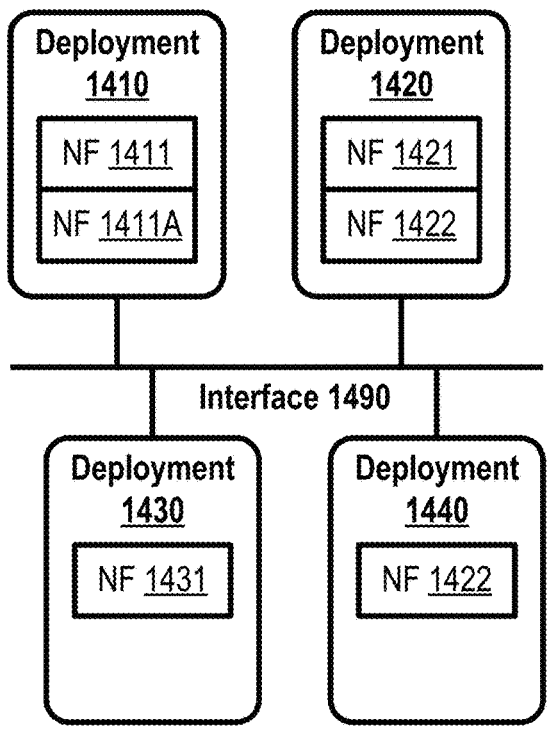
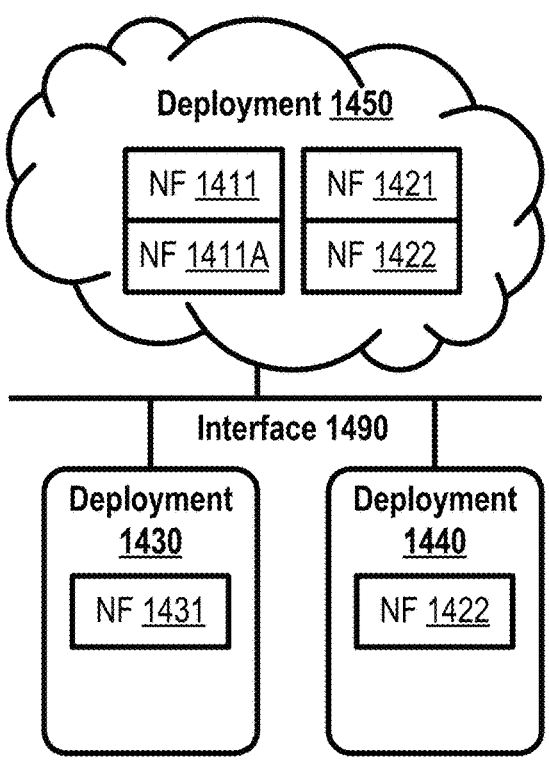
FIG. 14C
FIG. 14D

MEDIA DATA REPORTING

CROSS-REFERENCE TO RELATED APPLICATIONS

This application is a continuation of International Application No. PCT/US2023/036097, filed Oct. 27, 2023, which claims the benefit of U.S. Provisional Application No. 63/421,907, filed Nov. 2, 2022, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example communication networks including an access network and a core network.

FIG. 14A, FIG. 14B, FIG. 14C, and FIG. 14D illustrate various examples of physical core network deployments, each having one or more network functions or portions thereof.

DETAILED DESCRIPTION

Figure 2A:
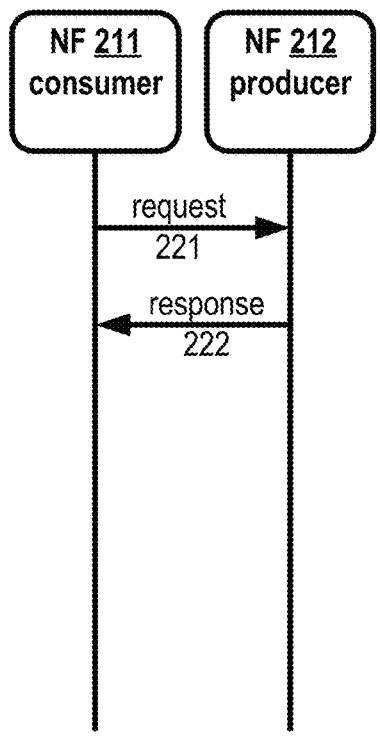
FIG. 2A, FIG. 2B, FIG. 2C, and FIG. 2D illustrate various examples of a framework for a service-based architecture within a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNS (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

Figure 2B:
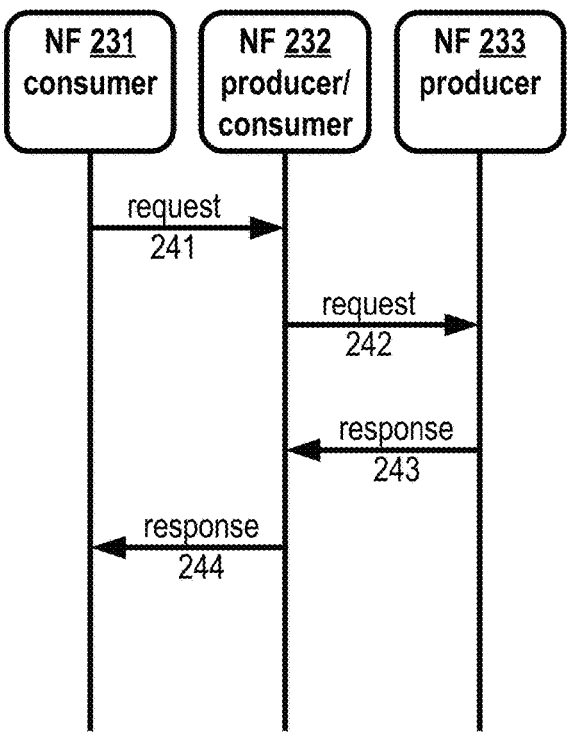

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

Figure 2C:
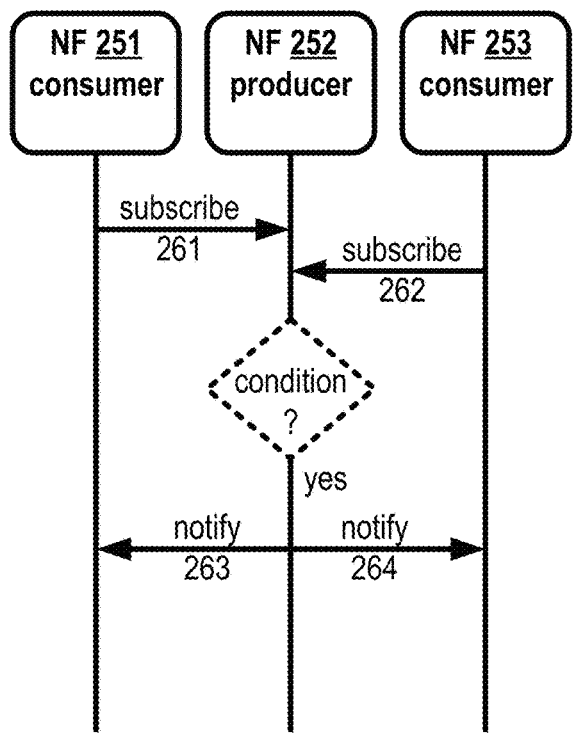

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

Figure 2D:
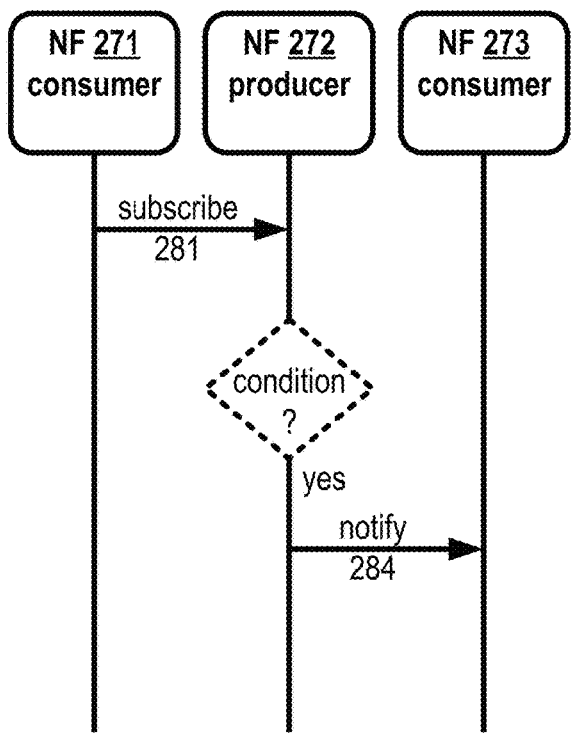

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
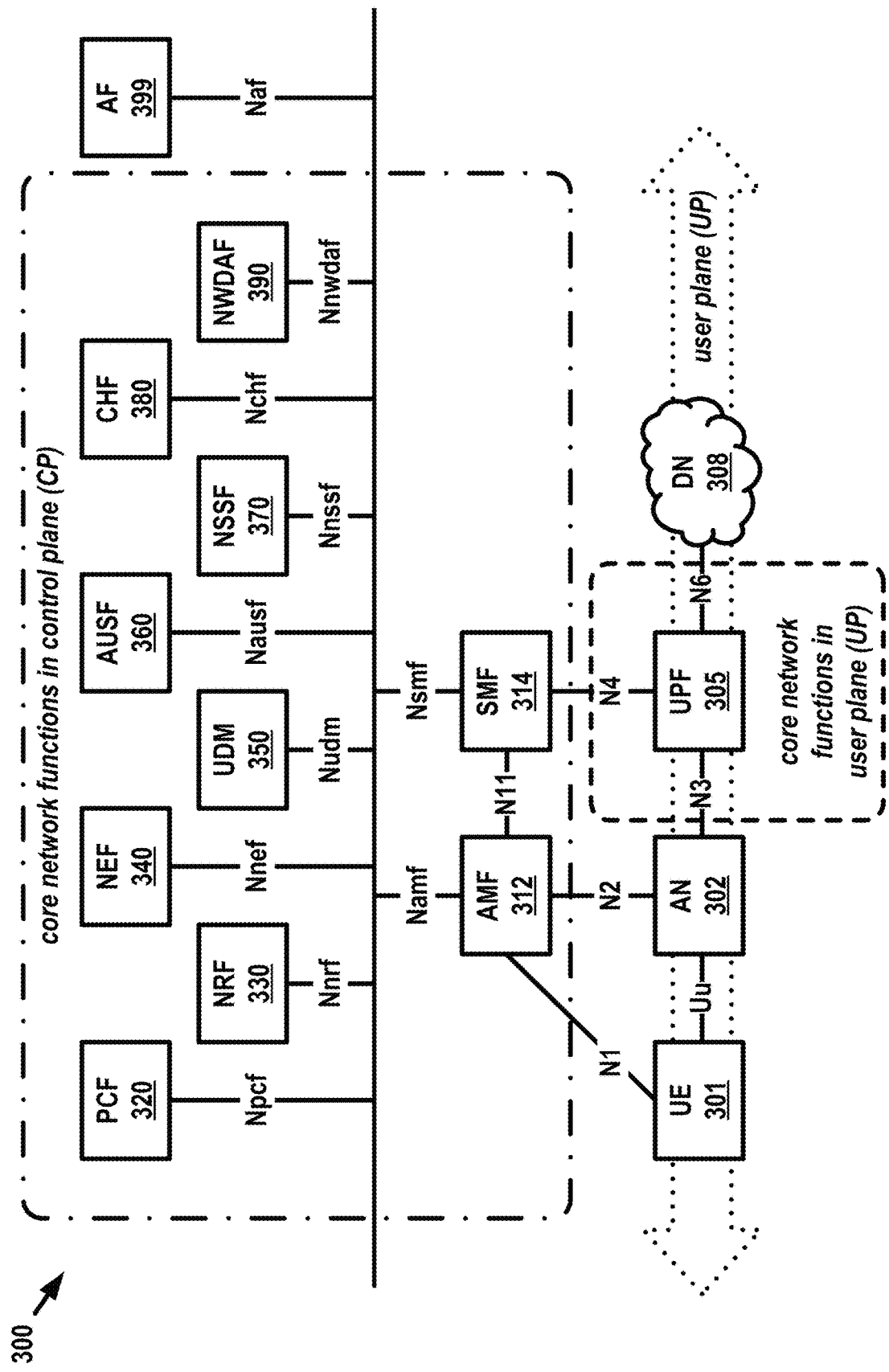
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
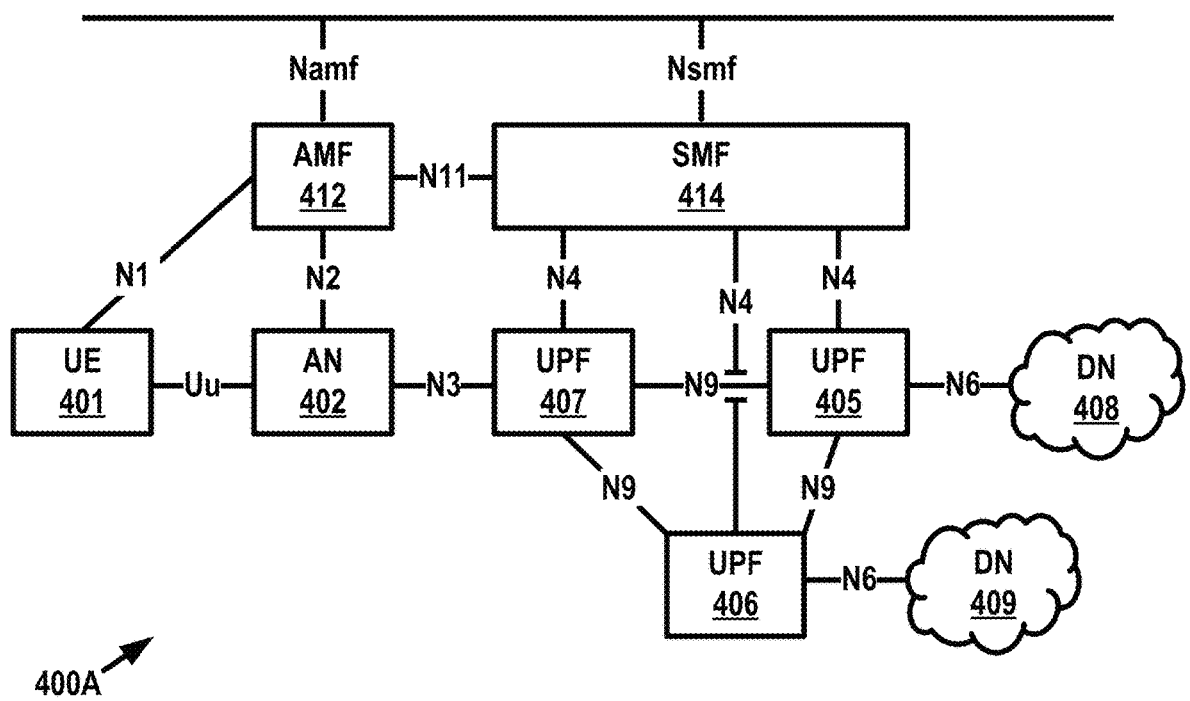
FIG. 4A and FIG. 4B illustrate example of core network architecture with multiple user plane functions and untrusted access.
Figure 4B:
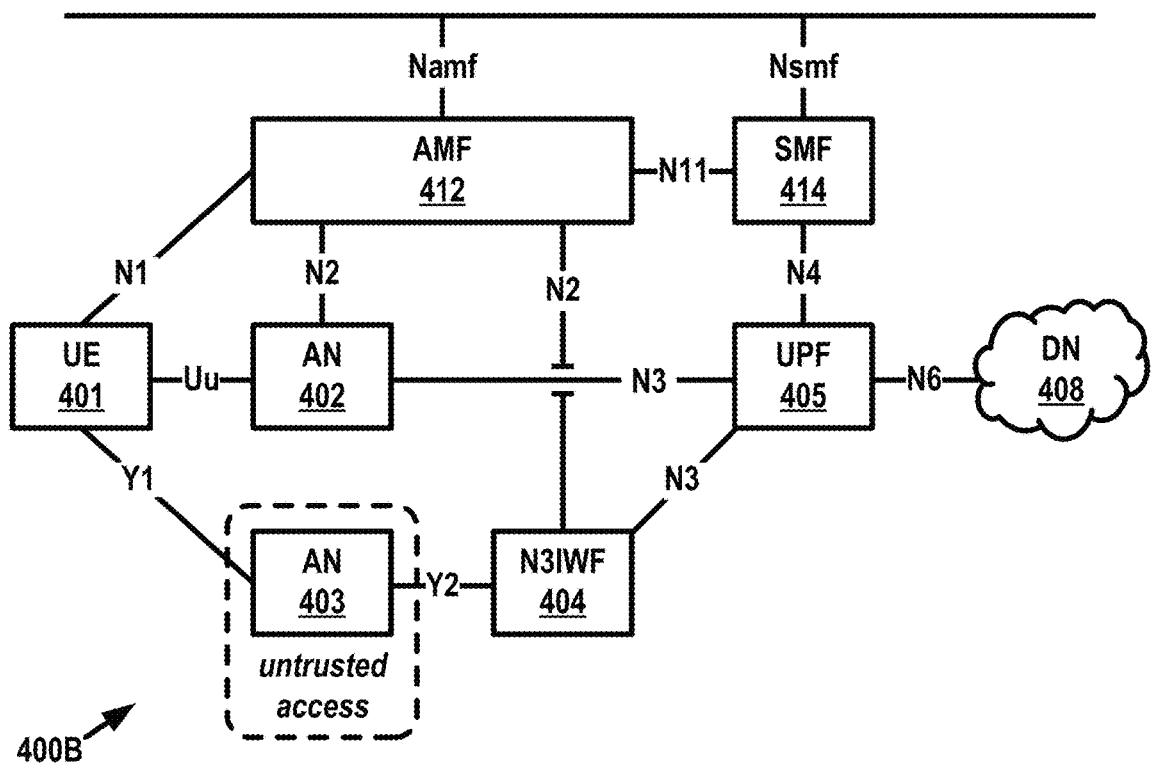
Figure 5:
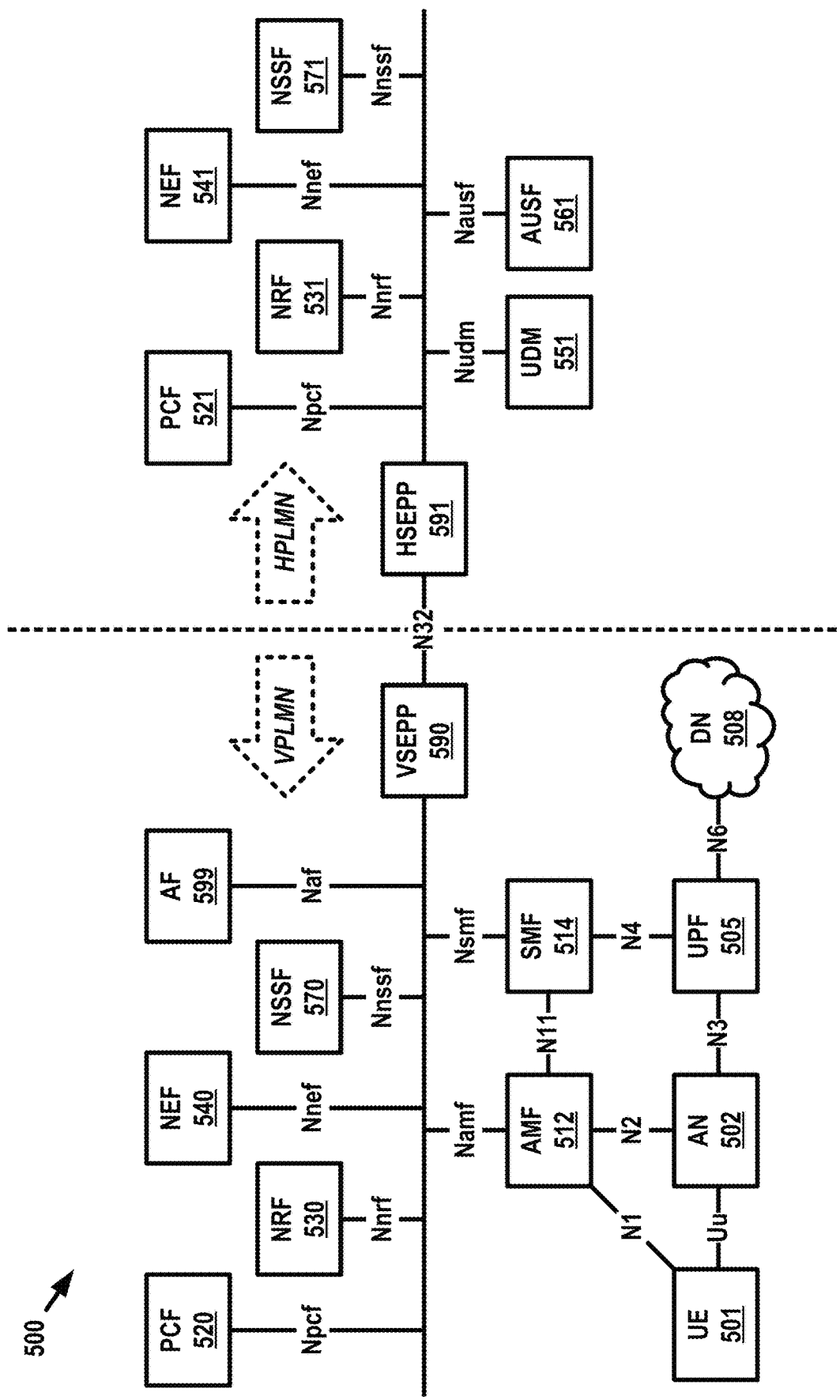
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNS (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
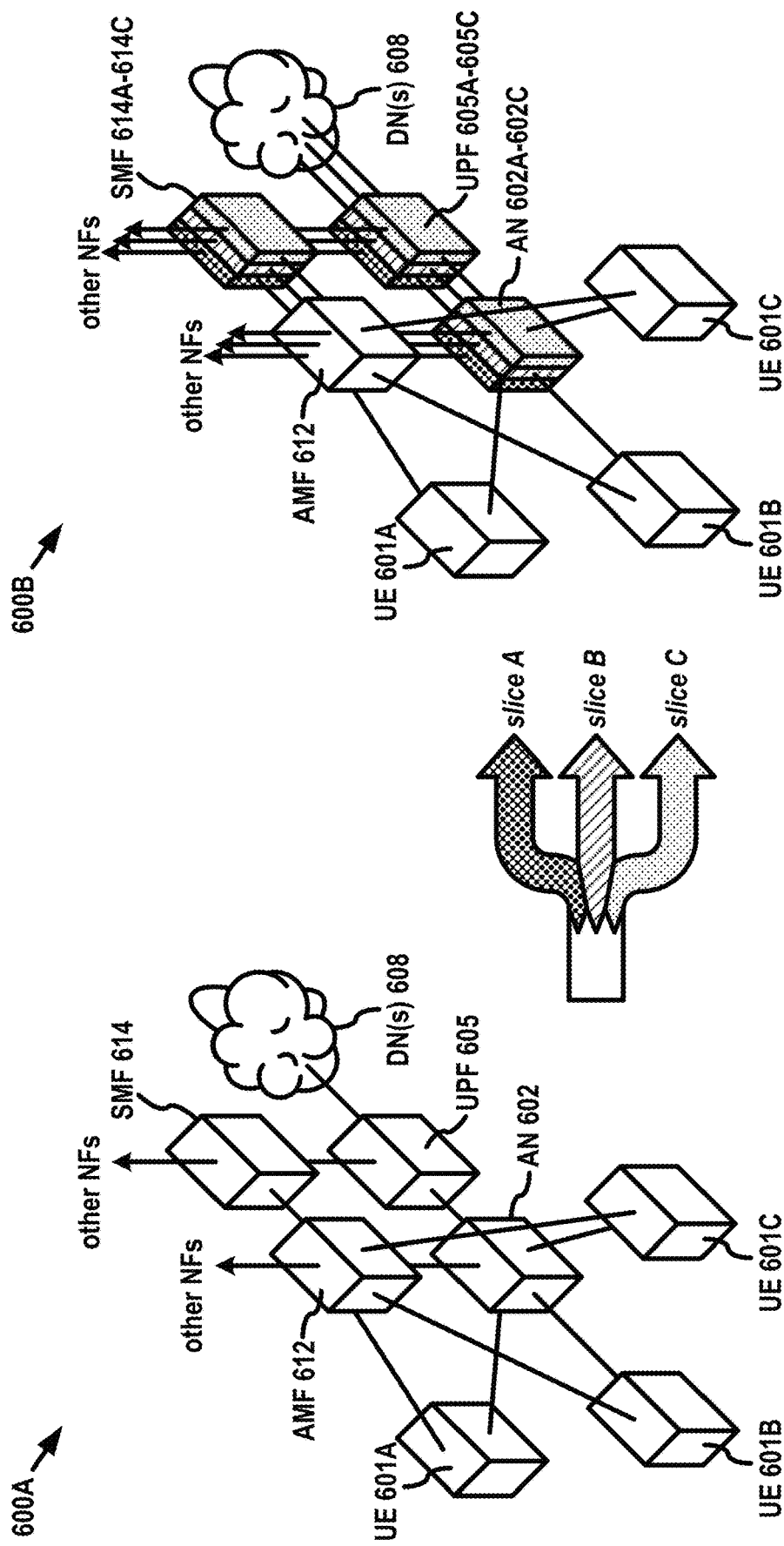
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

Figure 7C:
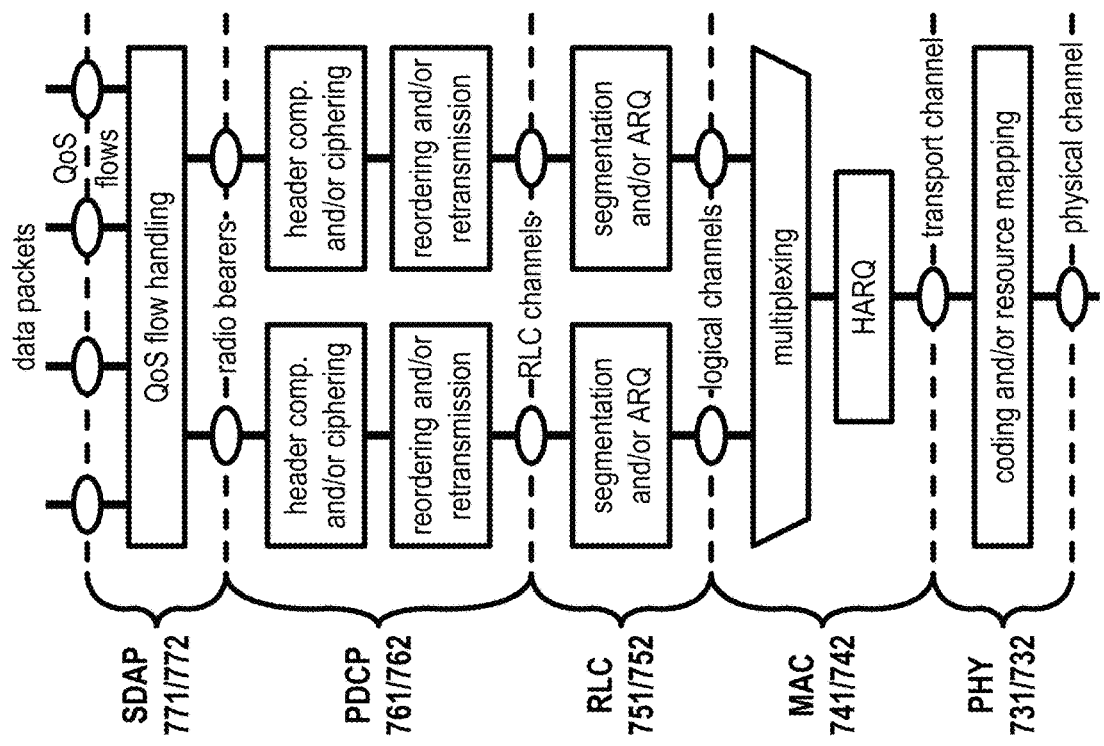
FIG. 7A, FIG. 7B, and FIG. 7C illustrate a user plane protocol stack, a control plane protocol stack, and services provided between protocol layers of the user plane protocol stack.
Figure 7A:
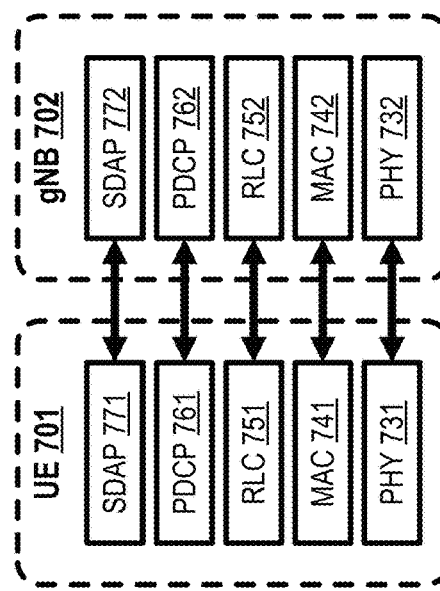
Figure 7B:
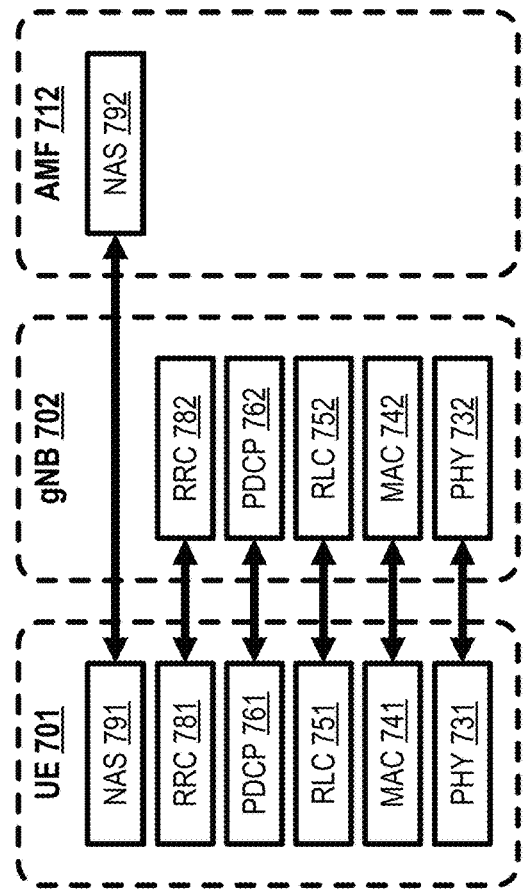

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
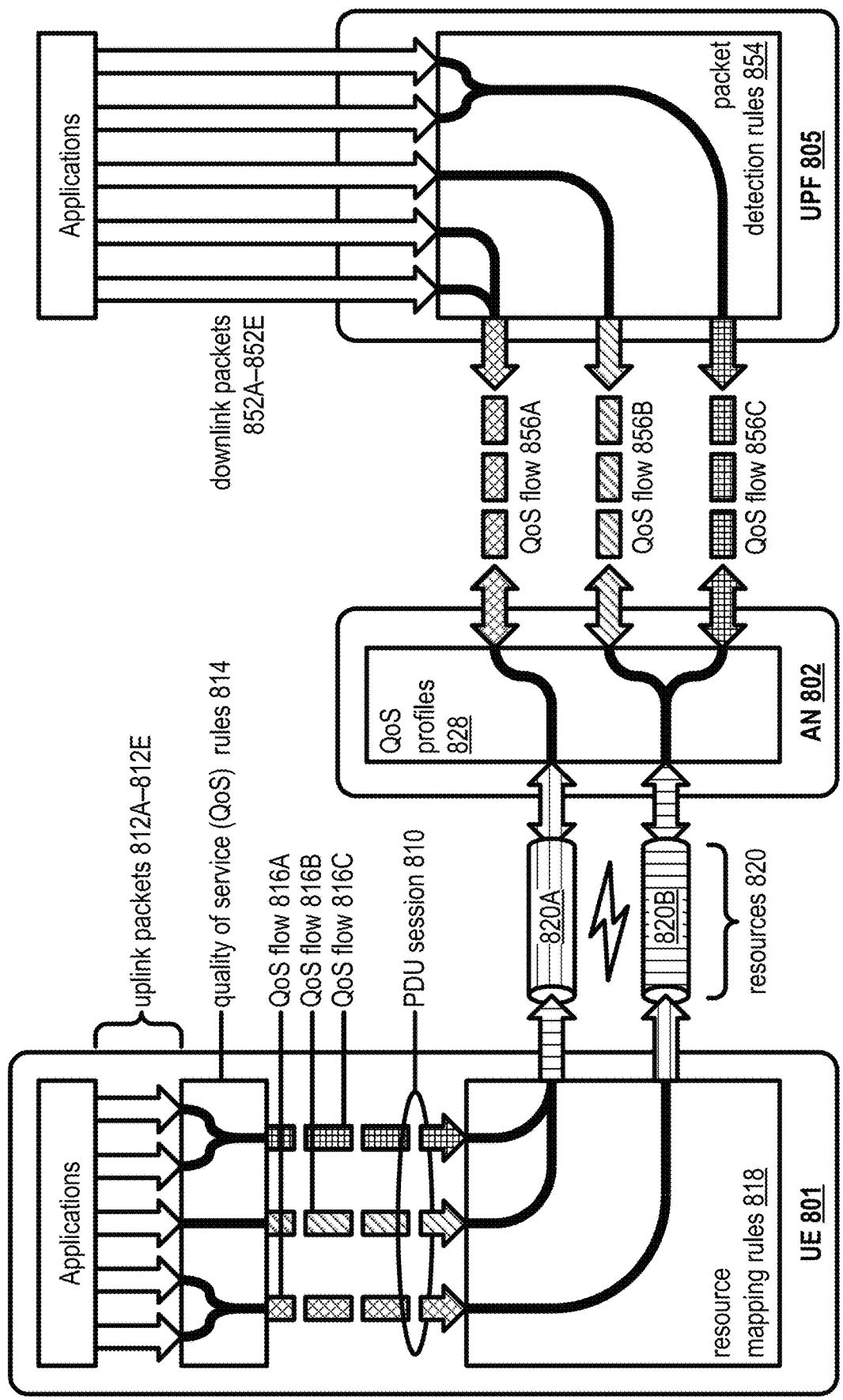
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
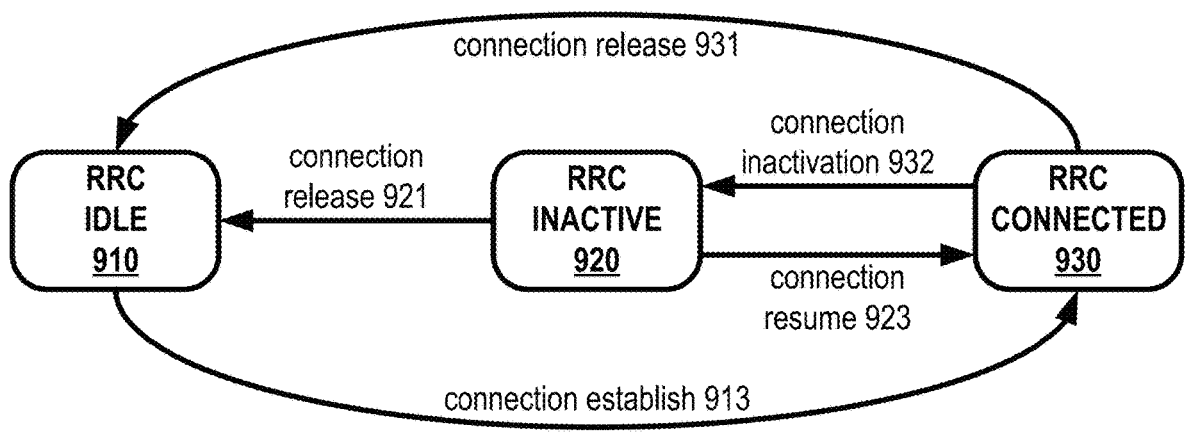
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
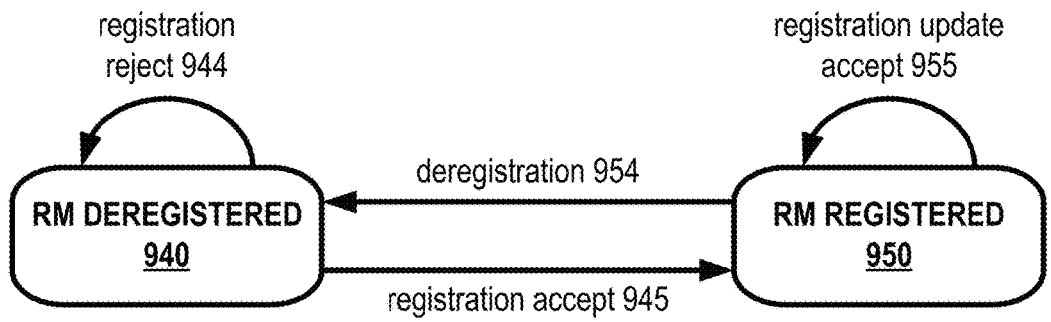

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
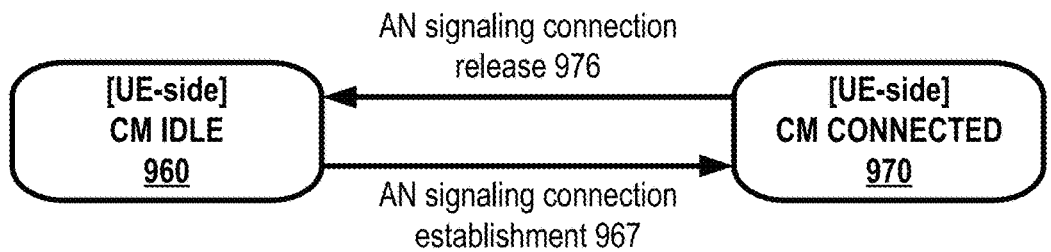

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
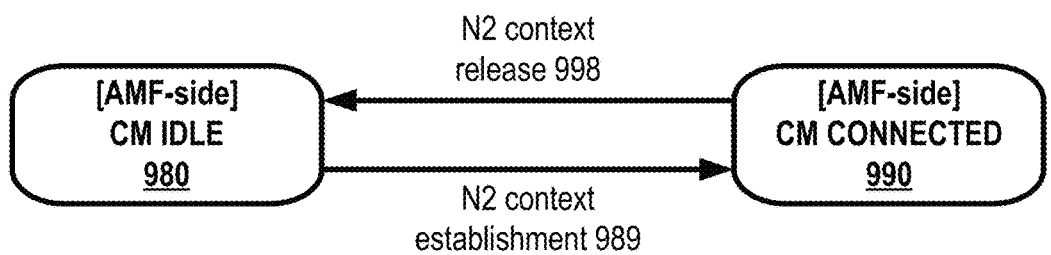

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
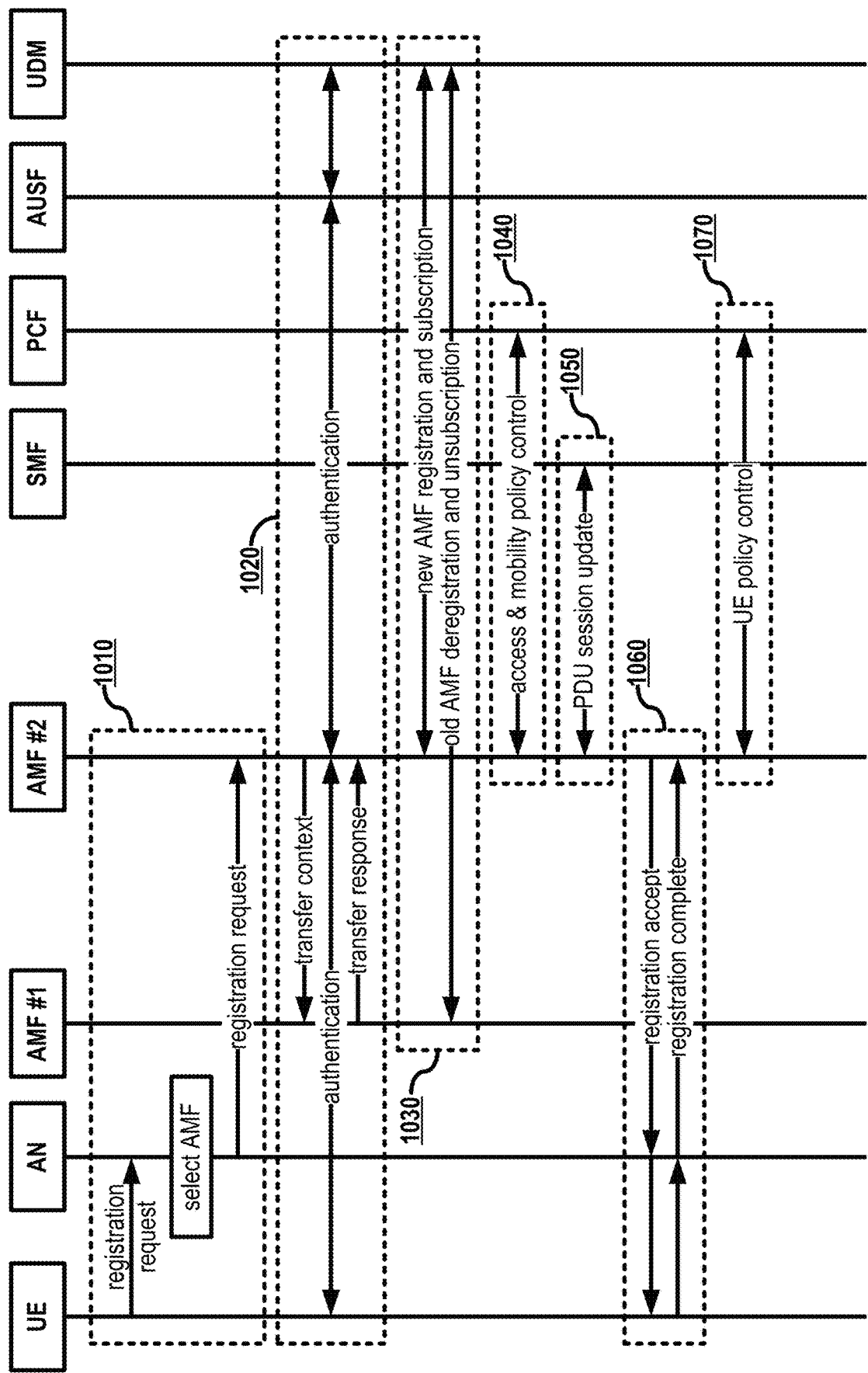
FIG. 10 illustrates an example of a registration procedure for a wireless device.
Figure 11:
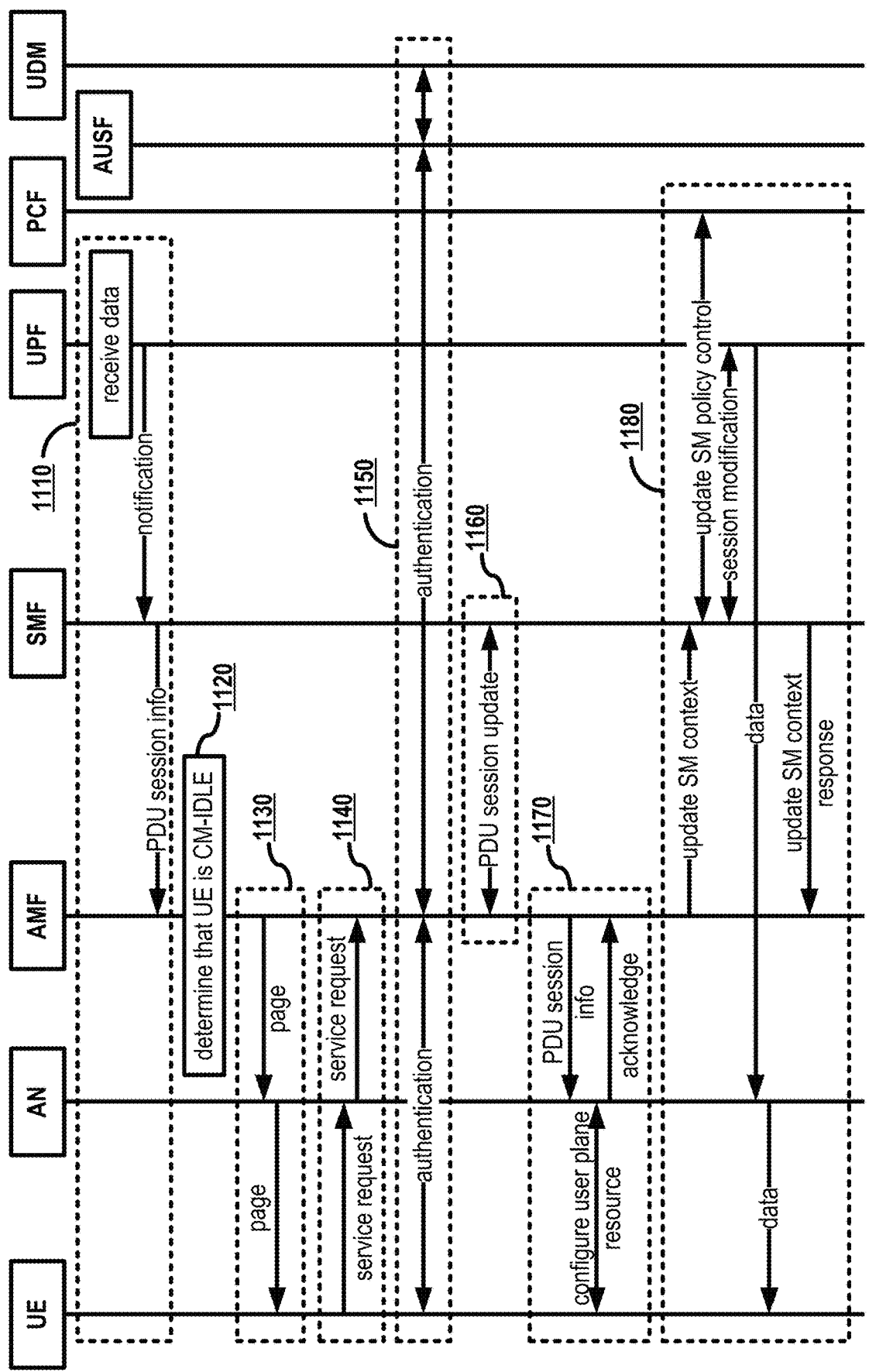
FIG. 11 illustrates an example of a service request procedure for a wireless device.
Figure 12:
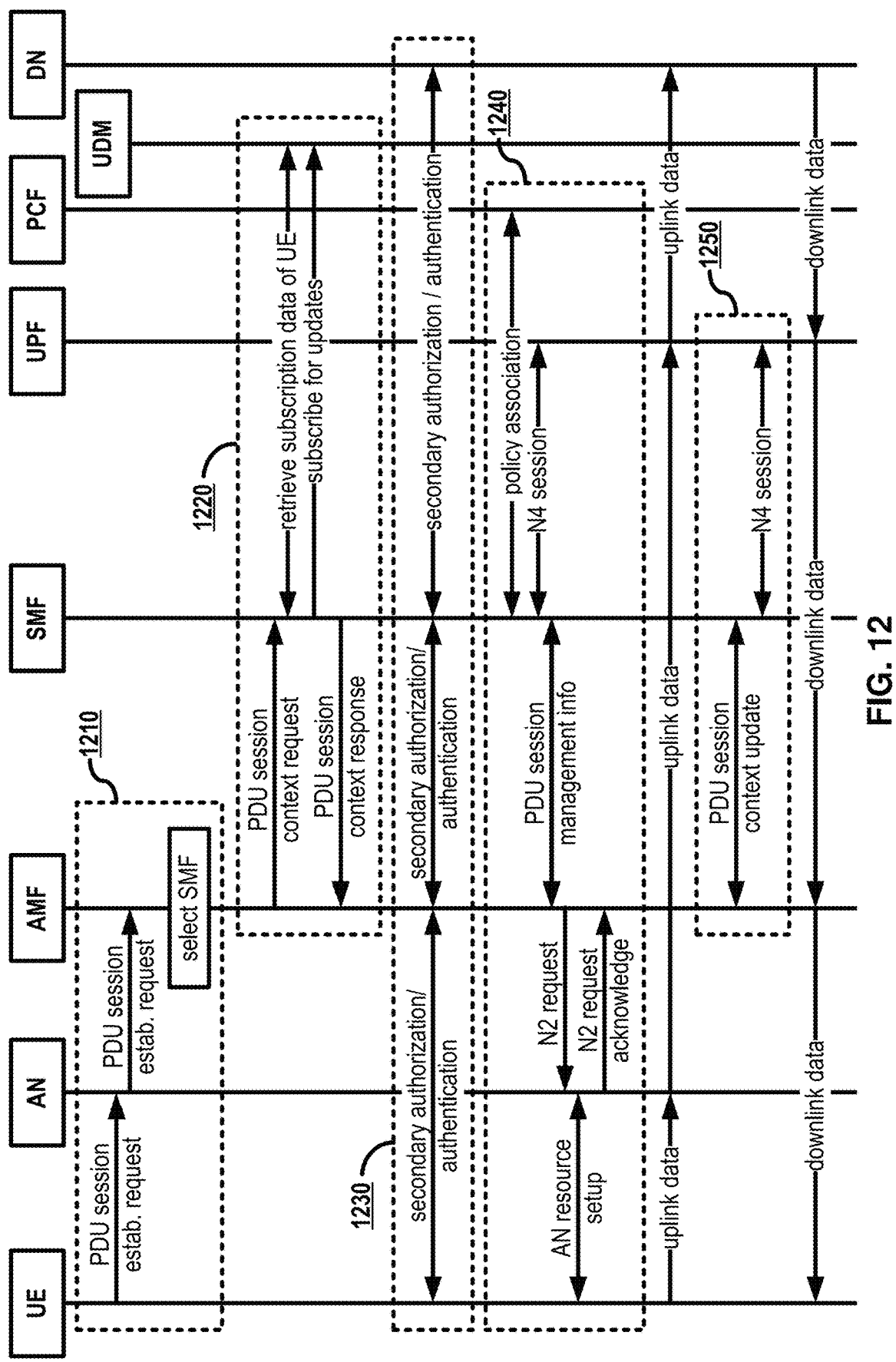
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContext-Transfer message. After the UE context is received, the AMF #2 may coordinate authentication of the UE. After authentication is complete, AMF #2 may send to AMF #1 a message indicating that the UE context transfer is complete. This message may be a Namf_Communication_UEContext-Transfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP). The service area restrictions may comprise a list of tracking areas where the UE is allowed to be served (or forbidden from being served). The access and mobility policies may include a UE route selection policy (URSP) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode;

and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSMContext Request and/or a Nsmf_PDUSession_UpdateSMContext Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_PDUSession_CreateSMContext Response and/or a Nsmf_PDUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/ or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a session service request (e.g., Namf_Communication_N1N2MessageTransfer) message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_PDUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
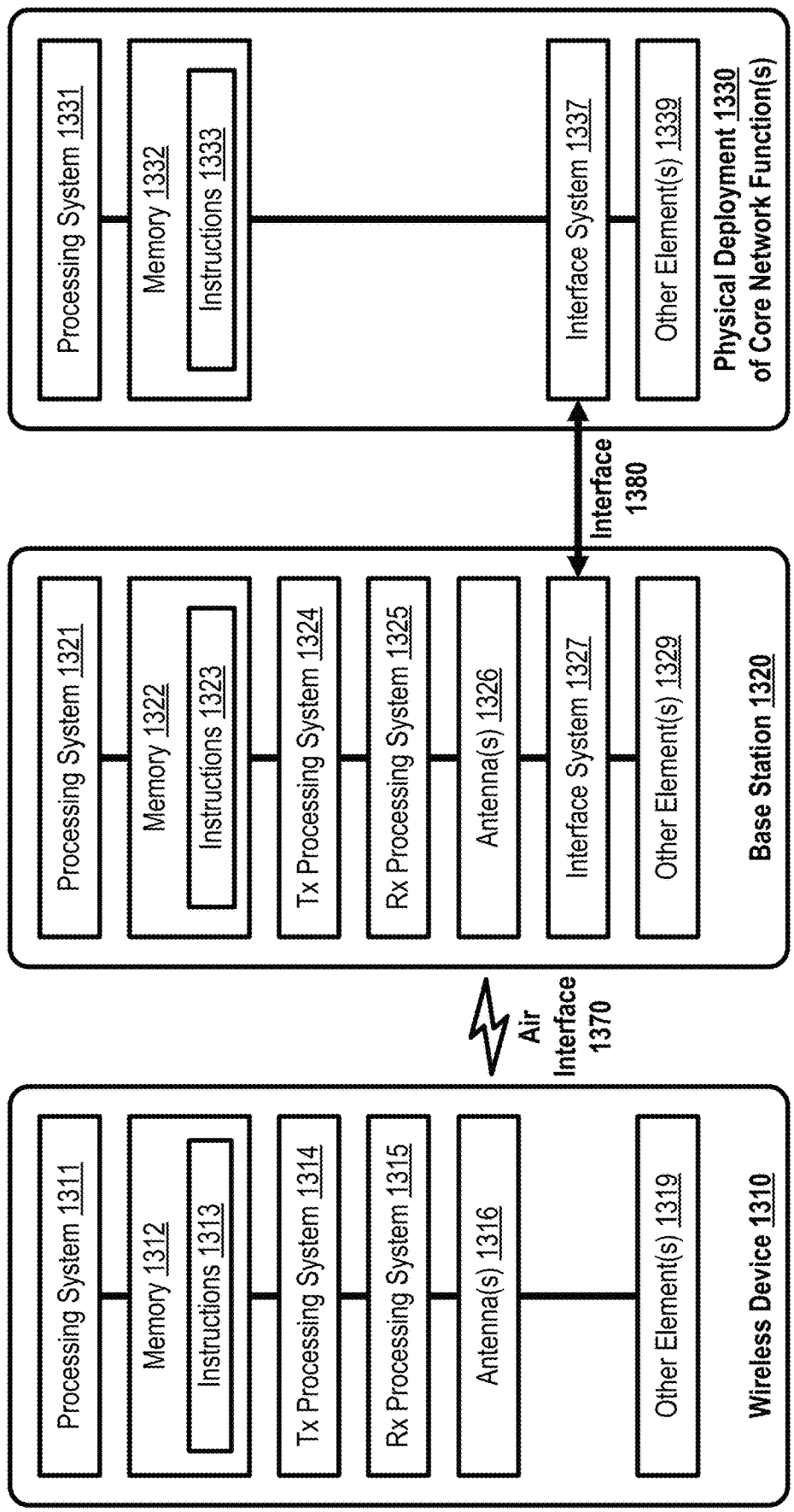
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab and/or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICS, FPGAs, and complex programmable logic devices (CPLDs). Computers, microcontrollers and microprocessors may be programmed using languages such as assembly, C, C++ and/or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figure 15:
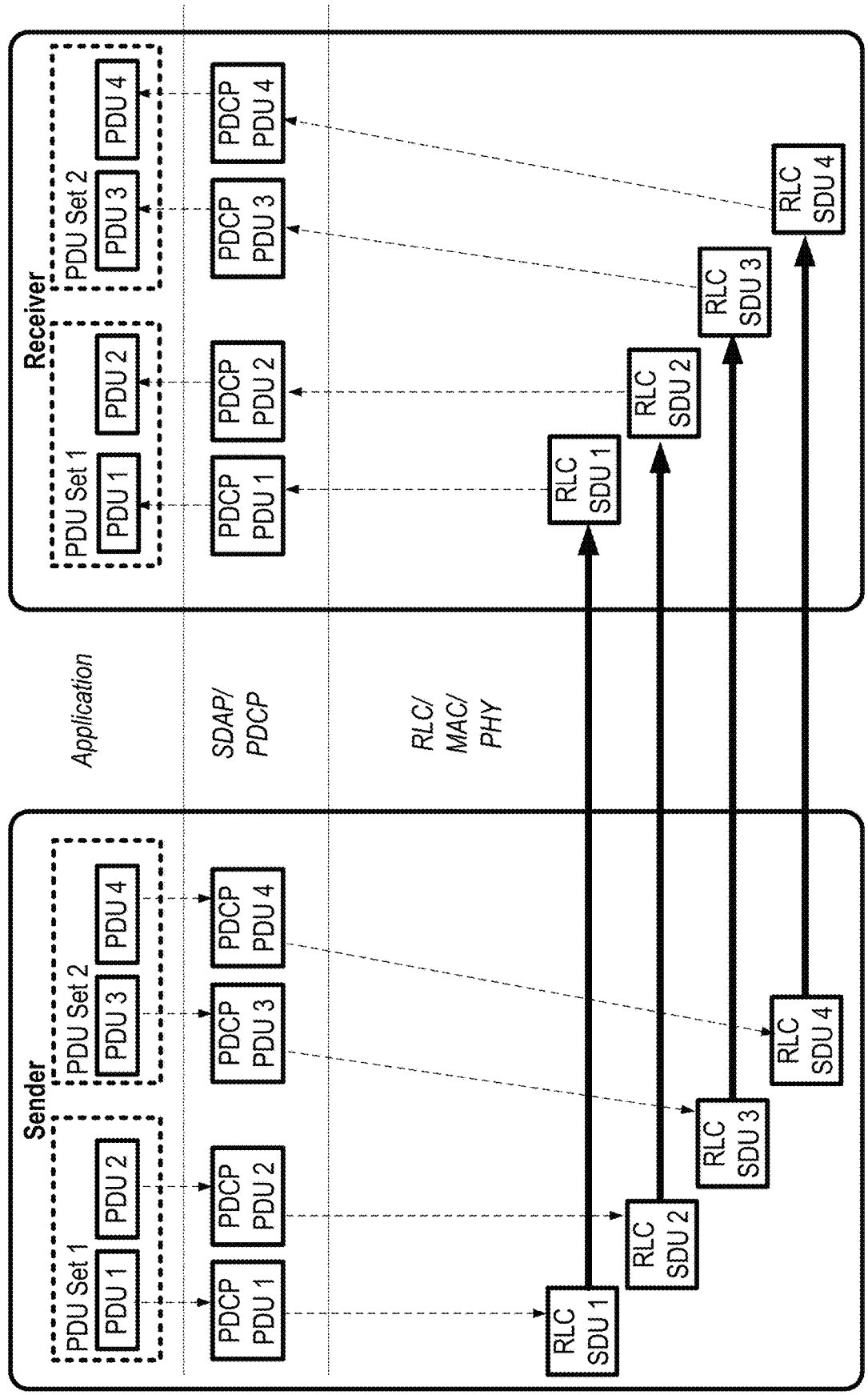
FIG. 15 is a diagram of an aspect of an example embodiment of the present disclosure.

An example embodiment depicted in FIG. 15 illustrates how data generated by an application is delivered from a sender to a receiver. The unit of data generated by the application may be an application data unit (ADU). The ADU may comprise, for example, a picture file, a video frame, text file and so on. The ADU may, for example, be generated and/or created by a first instance of a particular application, for use and/or enjoyment by a second instance of the application, or for processing by an application server of the application. To reliably deliver the ADU and/or to process the ADU efficiently, the ADU may be divided into one or more smaller units. For example, the one or more smaller units may be one or more protocol data units (PDUs). One or more first PDUs (e.g., PDU 1, PDU 2) for a first ADU may be of a first PDU set (e.g., PDU set 1). In an example, the first ADU may be segmented to the one or more first PDUs. The first PDU set may comprise the one or more first PDUs. One or more second PDUs (e.g., PDU 3, PDU 4) for a second ADU may be of a second PDU set (e.g., PDU set 2). In an example, the second ADU may be segmented to the one or more second PDUs. The second PDU set may comprise the one or more second PDUs.

In an example, the application may deliver the one or more first PDUs and/or the one or more second PDUs to an SDAP/PDCP entity (e.g., a SDAP entity, a PDCP entity, and/or both a SDAP entity and a PDCP entity). The first PDU (e.g., PDU 1) may be delivered from the application to the SDAP/PDCP entity. In the SDAP/PDCP entity, the first PDU may be a first SDAP SDU, a first SDAP PDU, a first PDCP SDU, and/or a first PDCP PDU. The second PDU (e.g., PDU 2) may be delivered from the application to the SDAP/PDCP entity. In the SDAP/PDCP entity, the second PDU may be a second SDAP SDU, a second SDAP PDU, a second PDCP SDU, and/or a second PDCP PDU. Similarly, the PDU 3 may be a third PDCP PDU (e.g., PDCP PDU 3) and/or the PDU 4 may be a fourth PDCP PDU (e.g., PDCP PDU 4).

In an example, one or more PDCP PDUs (e.g., PDCP PDU 1, 2, 3, 4) may be delivered from the SDAP/PDCP entity to a RLC entity. The RLC layer may provide functionality of forwarding the one or more packets, for example, over a particular interface, from one node to another, using a MAC entity and/or a PHY entity.

As depicted in FIG. 15, for example, the application in the sender may generate one or more PDU sets. For example, the one or more PDU sets comprise the first PDU set and/or the second PDU set. The application in the sender may deliver the one or more PDU sets to the SDAP/PDCP entity of the sender. The SDAP/PDCP entity may classify the one or more PDUs of the one or more PDU sets, may apply header compression to the one or more PDUs to reduce size of headers of the one or more PDUs, may apply ciphering to the one or more PDUs to provide security, and/or may generate one or more PDCP PDUs.

In an example, the SDAP/PDCP entity of the sender delivers the generated one or more PDCP PDUs to the RLC entity. The RLC entity may be responsible for transferring data between a UE and a NG-RAN, using the MAC entity and/or the PHY entity. For example, the RLC entity of the sender may process and generate one or more RLC PDUs for the one or more PDCP PDUs (e.g., RLC SDUs) delivered from the PDCP/SDAP entity. For example, the RLC entity may generate a first RLC PDU from the first PDCP PDU (e.g., the first RLC SDU) and/or the RLC entity may generate a second RLC PDU from the second PDCP PDU (e.g., the second RLC SDU).

In an example, the one or more RLC PDUs generated by the RLC entity of the sender may be delivered to the MAC entity of the sender. The MAC entity of the sender may send the one or more RLC PDUs to a MAC entity of the receiver. The MAC entity of the receiver may deliver the one or more RLC PDUs to a RLC entity of the receiver. For example, the RLC entity of the receiver may receive the one or more RLC PDUs (e.g., RLC PDU 1, 2, 3, 4). The RLC entity of the receiver may recover the one or more RLC SDUs (e.g., PDCP PDUs) using the one or more RLC PDUs. The RLC entity may deliver the one or more recovered PDCP PDUs to a PDCP entity of the receiver. The PDCP entity of the receiver may process the one or more received PDCP PDUs, and/or may recover one or more PDUs from the one or more PDCP PDUs. To recover a PDCP SDU (or RLC SDU) from a PDCP PDU (or a RLC PDU) may be that the PDCP PDU is extracted from the PDCP PDU, that the PDCP PDU is re-assembled from the PDCP SDU.

Figure 16:
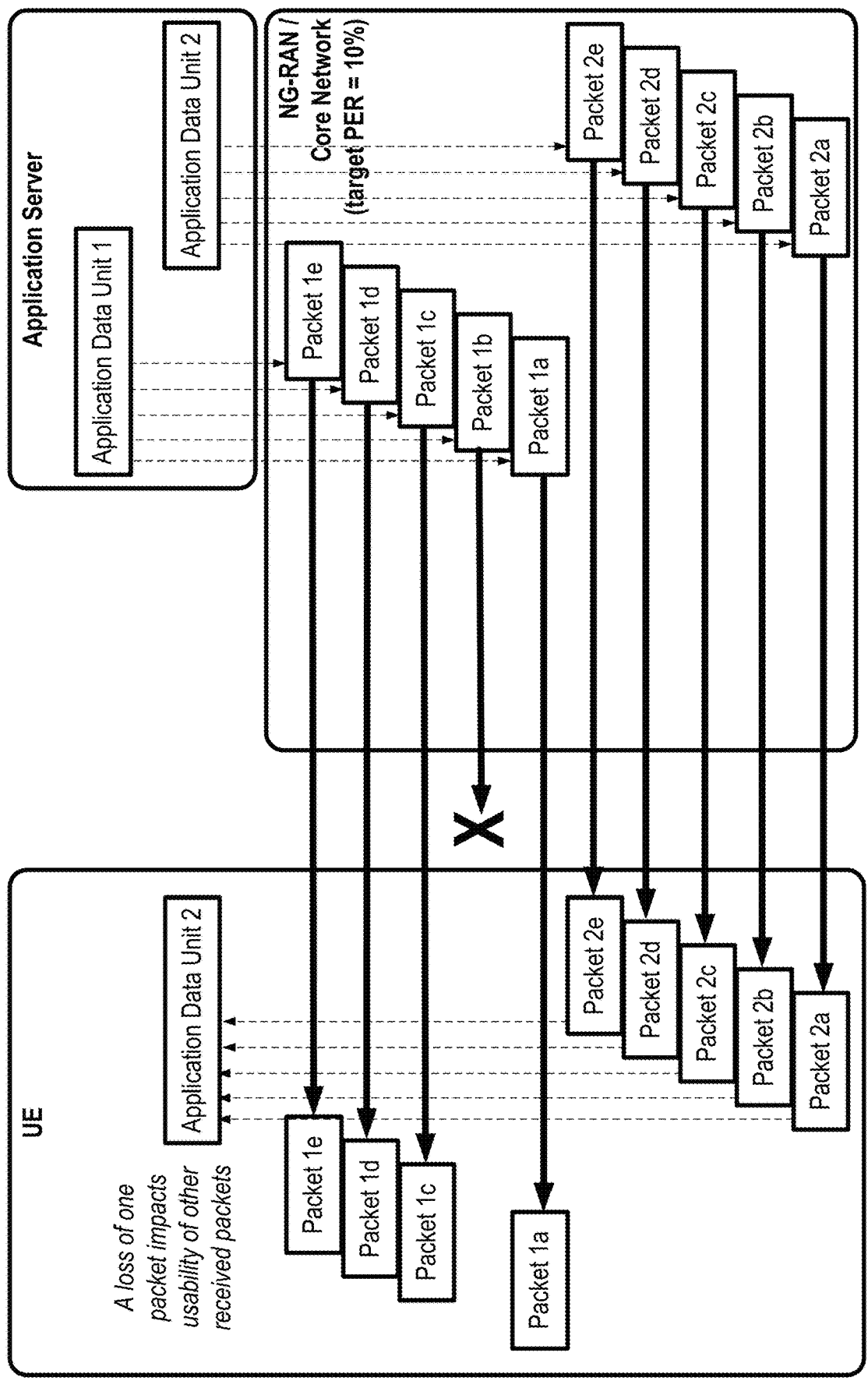
FIG. 16 is a diagram of an aspect of an example embodiment of the present disclosure.

FIG. 16 illustrates an example of data delivery where one or more packets (PDUs) are not delivered from a sender to a receiver. For brief illustration, in the FIG. 16, it will be understood that a packet may be a RLC PDU, a RLC SDU, a PDCP PDU, a PDCP SDU, a SDAP SDU, a SDAP PDU and/or a PDU. For brief illustration, in the FIG. 16, data delivery from an application server to a UE is shown. It will be understood that similar handling may apply for data delivery from the UE to the application server.

In the example of FIG. 16, the application server may generate one or more ADUs. The one or more ADUs may comprise a first ADU (ADU 1) and/or a second ADU (ADU 2). The one or more ADUs may comprise one or more packets. The ADU 1 may comprise one or more first packets (e.g., packet 1a, 1b, 1c, 1d, 1e). The one or more first packets may comprise a first PDU set (PDU set 1). The first PDU set may comprise the one or more first packets associated with the ADU 1. The ADU 2 may comprise one or more second packets (e.g., packet 2a, 2b, 2c, 2d, 2e). The one or more second packets may comprise a second PDU set (PDU set 2). The second PDU set may comprise the one or more second packets associated with the ADU 2.

In an example, a core network of the network may receive the one or more packets sent by the application server. The core network may forward the one or more packets to a NG-RAN. The NG-RAN may receive the one or more packets.

In an example, the NG-RAN may send the one or more packets (e.g., packet 1a, 1b, 1c, 1d, 1e, 2a, 2b, 2c, 2d, 2e) to the UE. One or more packets (of the one or more packets received by the NG-RAN from the core network, of the one or more packets sent by the NG-RAN) may not be received by the UE. For example, the UE may receive one or more third packets (e.g., packet 1a, 1c, 1d, 1e, 2a, 2b, 2c, 2d, 2e) and/or the UE may not receive one or more fourth packets (e.g., packet 1b).

In an example, the NG-RAN may be configured with target packet error rate (PER)=0.1 for the QoS flow. From the NG-RAN point of view, 9 out of 10 packets are delivered (e.g., 1 out of 10 packets are not delivered/lost/failed). The NG-RAN may determine that the target PER is met and/or that the NG-RAN does not retransmit the packet 1b.

In an example, the UE may recover one or more ADUs using the one or more third packets. For example, the UE may recover the ADU 2 from the third packets. The UE may not recover one or more ADUs. For example, because the UE fails to receive the packet 1b, the UE may not be able to recover the ADU 1 (which the packet 1b is associated with).

As can be seen in the example of FIG. 16, if one or more PDU (packets) of a PDU set is not received by a receiver, the receiver may not be able to use other received PDUs. For example, because the UE does not receive the packet 1b, other successfully received packets (e.g., packet 1a, 1c, 1d, 1e) may not be useful to the receiver. In the existing technologies, the NG-RAN (or the UE) may treat each packet (PDU) individually and may not consider how one or more packets are related. For example, an associated PDU set of a PDU may be considered. This may degrade user experience, because loss of a PDU (for a PDU set) may be associated with loss (not usefulness) of several PDUs (e.g., of the PDU set).

Figure 17:
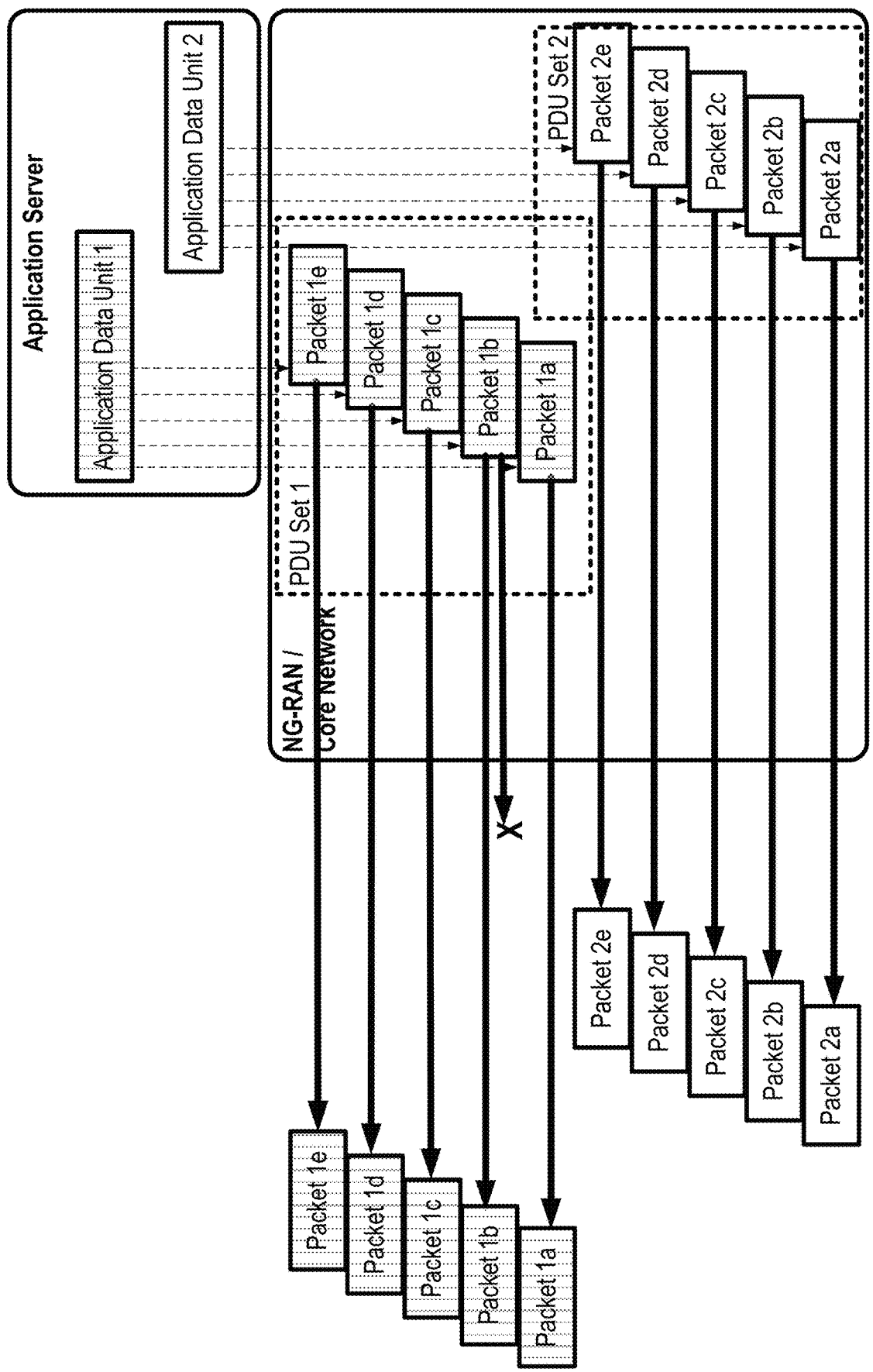
FIG. 17 is a diagram of an aspect of an example embodiment of the present disclosure.

FIG. 17 illustrates an example of data delivery to address the example of FIG. 16. For example, information of a PDU set associated with a PDU may help in increasing reliability of data delivery. Similar to the previous figure (e.g., FIG. 16), the NG-RAN may transmit the one or more packets to the UE. For brevity, redundant details will be omitted.

In an example, the core network of the network may receive the one or more packets sent by the application server. The core network may forward the one or more packets to the NG-RAN, with one or more PDU set information. For example, a PDU set information of the one or more PDU set information may indicate to which PDU set a PDU belongs. For example, for the packets associated with the PDU set 1, the PDU set information may indicate that the packets (e.g., packet 1a, 1b, 1c, 1d, 1e) may be associated with the PDU set 1. For example, for the packets associated with the PDU set 2, the PDU set information may indicate that the packets (e.g., packet 2a, 2b, 2c, 2d, 2e) may be associated with the PDU set 2.

In an example, the NG-RAN may receive the one or more packets with one or more PDU set information. The NG-RAN may send the one or more packets to the UE. For example, the NG-RAN may send the packet 1a of the first PDU set. The UE may receive the packet 1a. Based on that the packet 1a is delivered to the UE, the NG-RAN may send next packet (e.g., packet 1b) of the first PDU set. For example, the UE may fail to receive the packet 1b, if the UE moves into a tunnel. The NG-RAN may determine that the packet 1b is not successful delivered to the UE. For example, the UE may send a report to the NG-RAN that the UE fails to receive the packet 1b, and/or the NG-RAN may not receive an acknowledgement for the packet 1b. Based on the report from the UE and/or based on not receiving the acknowledgement, the NG-RAN may determine to retransmit the packet 1b of the first PDU set to the UE. The UE may receive the packet 1b retransmitted by the NG-RAN. Based on that the packet 1b is delivered, the NG-RAN may continue to send other packets (e.g., packet 1c, 1d, 1e) of the first PDU set. When the packets of the first PDU are delivered to the UE, the NG-RAN may move on to send packets of the second PDU set.

In an example, the UE may recover one or more ADUs using the one or more received packets.

As FIG. 17 shows, retransmission may help in reliable data delivery from the sender to the receiver. For example, based on the PDU set information, the NG-RAN may be able to determine which one or more packet (or PDUs) of a PDU set is not delivered to the UE. Based on the determination, the NG-RAN may attempt to retransmit the one or more PDUs. However, this retransmission may bring another problem, as shown in the example of FIG. 18.

Figure 18:
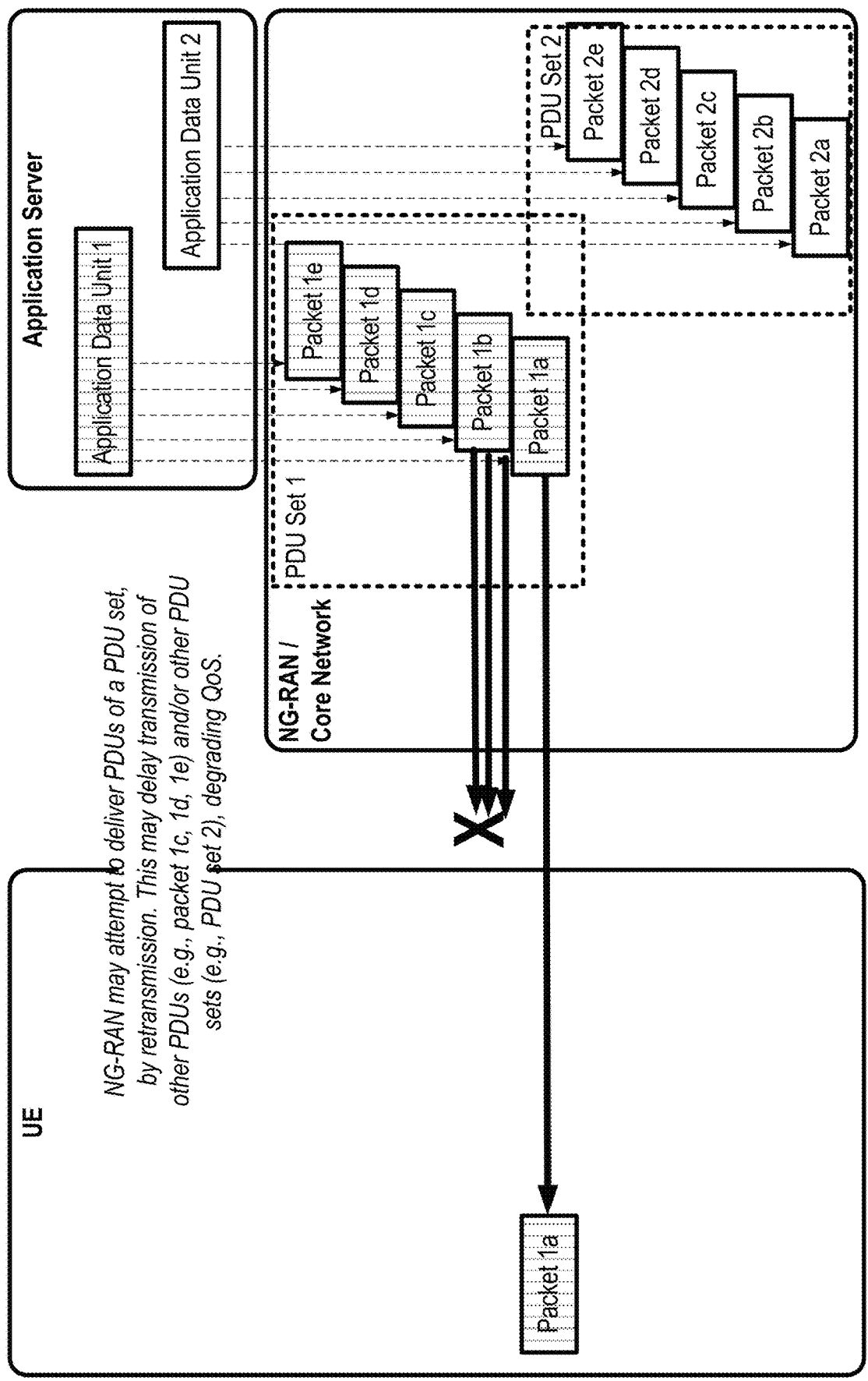
FIG. 18 is a diagram of an aspect of an example embodiment of the present disclosure.

FIG. 18 illustrates an example in which the packet 1b is retransmitted. Similar to the previous figure (e.g., FIG. 17), the NG-RAN may perform retransmission of the packet 1b of the PDU set 1. For example, based on not receiving acknowledgement from the UE, the NG-RAN may determine to perform retransmission of the packet 1b.

In an example, the UE may not receive the packet 1b retransmitted by the NG-RAN. For example, if the UE is in a bad radio condition (e.g., in an elevator), or if a size of packet 1b is larger than a radio condition can support, the retransmission of the packet 1b may fail. Because the packet 1a of the PDU set 1 is delivered to the UE, the NG-RAN may try to send other packets of the PDU set 1 and/or may not consider the target PER for the PDU set 1. Accordingly, the NG-RAN may perform retransmission of the packet 1b several times. This retransmission by the NG-RAN may delay transmission of other packets (e.g., packet 1c, 1d, 1e, 2a, 2b, 2c, 2d, 2e).

In an example, the ADU 1 and/or the ADU 2 may be one or more video frames of a video application (e.g., live TV). For example, the video application may generate an ADU in every 33 ms (assuming 30 frames per second). For example, the video application (of the application server) may generate the first ADU (e.g., the first frame) at t=0 ms and/or the second ADU (e.g., the second frame) at t=33 ms. For example, the video application (of the UE) may expect to receive the one or more ADU in every 33 ms. For example, the video application of the UE may be programmed to play the first ADU at t=33 ms and/or the second ADU at t=66 ms. If the UE receives the one of more PDUs of the first ADU after t=33 ms, it means that the one or more PDUs of the first ADU are not useful for the application, because the one or more PDUs are received after a playback deadline. For example, because of (re-) transmission of the one or more PDUs of the first PDU set, if the NG-RAN delays transmission of the one or more PDUs of the second PDU set until t=66 ms, the application of the UE cannot play the second frame at a scheduled time (e.g., t=66 ms). Accordingly, transmission and/or re-transmission based on a PDU set information may cause degradation of QoS, because of delivery delay.

Example embodiments of the present disclosure cure the above issues and improve system efficiency by enhancement in operation of a network and/or a UE. In an example, a first network node (e.g., a SMF, a PCF, an AMF, an AF, a NEF, and/or the like) may assist a second network node (e.g., a gNB, a NG-RAN, and/or the like) with information of QoS parameters for a QoS flow delivering one or more PDU sets, and/or QoS parameters for PDU set. In another example, the second network node may assist the first network node, with information on fulfilled (or not fulfilled) QoS for the QoS flow of one or more PDU sets. In another example, the second network node may determine one or more alternative QoS parameter fulfilled for the QoS flow of one or more PDU sets and/or may indicate the fulfilled alternative QoS parameter to the first network node. These signaling enhancements may provide enhanced QoS control for the QoS flow of the one or more PDU sets, and/or may provide better user experience for an application using the one or more PDU sets.

In the specification, the term "NG-RAN" may be interpreted as a base station, which may comprise at least one of a gNB, an eNB, a ng-eNB, a NodeB, an access node, an access point, an N3IWF, a relay node, a base station central unit (e.g., gNB-CU), a base station distributed unit (e.g., gNB-DU), and/or the like. In the specification, a gNB may be interpreted as a base station. In the specification, a gNB-CU may be interpreted as a base station central unit. In the specification, a gNB-DU may be interpreted as a base station distributed unit.

In the specification, the term "core network" node may be interpreted as a core network device, which may comprise at least one of an AMF, a SMF, a NSSF, a UPF, a NRF a UDM, a PCF, a SoR-AF, an AF, an DDNMF, an MB-SMF, an MB-UPF and/or the like. A term of core network may be interpreted as a core network node. In the specification, a term of an access node may be interpreted as a base station, which may comprise a NG-RAN, and/or the like.

In the specification, the term "network node" may be interpreted as a core network node, an access node, a UE, and/or the like. A network may comprise one or more network nodes.

In the specification, a protocol entity may be interpreted as an entity performing a set of specific functions related to a wireless access (e.g., LTE access, NR access) and/or a wireline access (e.g., Ethernet) and/or communication (e.g., TCP, IP). In an example, an entity may be interpreted as a protocol entity. In an example, the protocol entity of LTE and/or NR may be at least one of a SDAP entity, a PDCP entity, a RLC entity, a MAC entity and/or a PHY entity. In an example, a layer (e.g., a SDAP layer, a PDCP layer, a RLC layer, a MAC layer a PHY layer) may be interpreted as a protocol entity (e.g., SDAP entity, a PDCP entity, a RLC entity, a MAC entity, a PHY entity).

Figure 26:
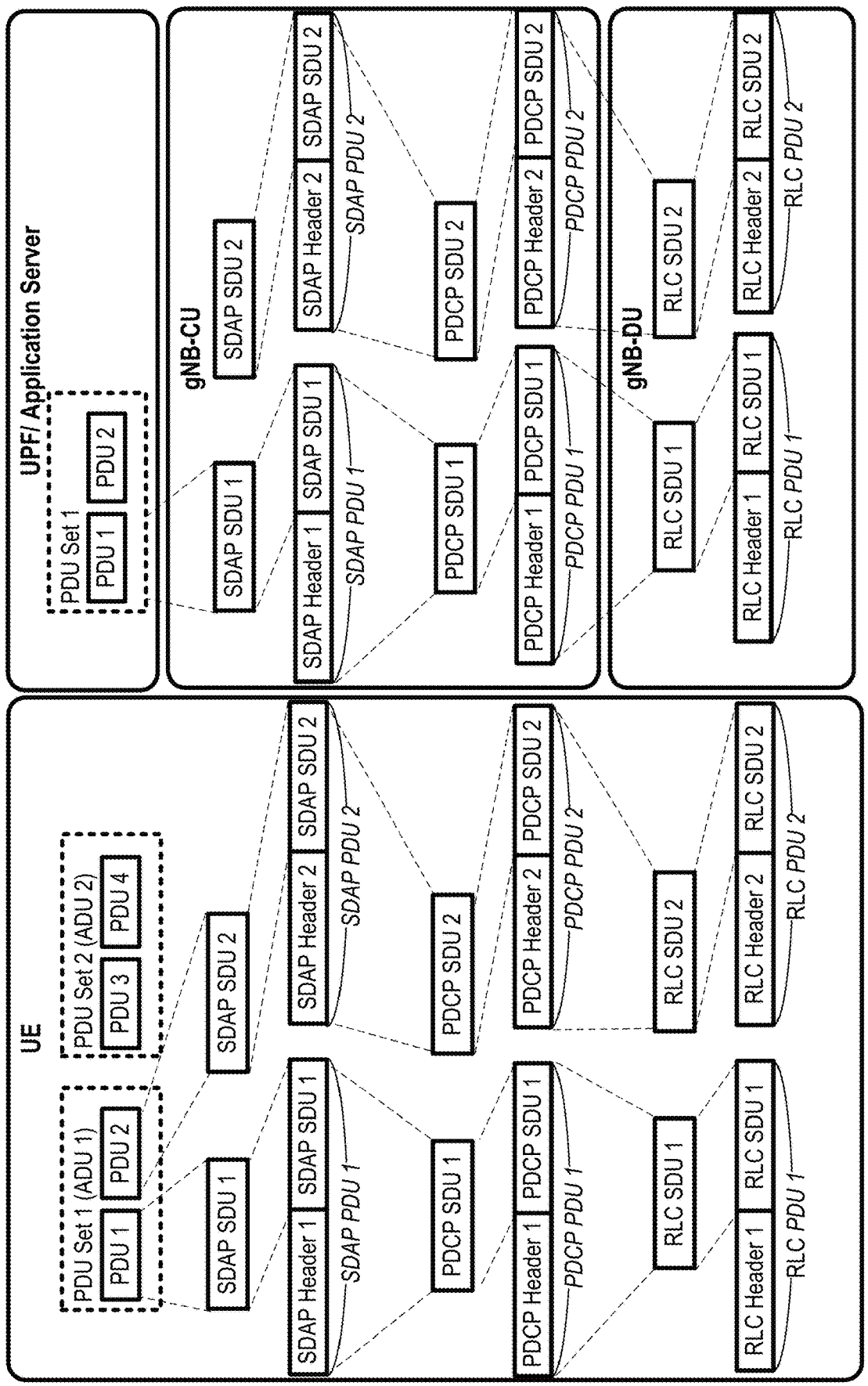
FIG. 26 is a diagram of an aspect of an example embodiment of the present disclosure.

In the specification, a service data unit may be interpreted as a unit of a data, received by a protocol entity. In the specification, a protocol data unit may be interpreted as a unit of a data, sent by a protocol entity. A protocol entity may receive one or more service data units (SDUs) from other protocol entity, and the protocol entity may send one or more protocol service data units (PDUs) to another protocol entity of same host or another host. For example, a PDCP entity may receive one or more PDCP SDUs from a higher entity (e.g., an SDAP entity) and the PDCP entity may send one or more PDCP PDUs to a lower entity (e.g., an RLC entity). The lower entity (e.g., an RLC entity) may receive one or more SDUs (e.g., RLC SDUs) from the higher layer. The one or more SDUs received by the lower layer may be same as the one or more PDUs sent by the higher layer. FIG. 26 illustrates one example of relationship between one or more PDUs and/or one or more SDUs. For example, PDU 1 and PDU 2 may be generated by an application of a sender (a UE or in an application server). The PDU 1 and the PDU 2 may be delivered to a sending SDAP entity as a SDAP SDU 1 and 1 SDAP SDU 2. The sending SDAP entity may construct a SDAP PDU 1 from a SDAP header 1 and the SDAP SDU 1. The sending SDAP entity may deliver the SDAP PDU 1 to a sending PDCP entity. The sending PDCP entity may receive the SDAP PDU 1 as a PDCP SDU 1. The sending PDCP entity may construct a PDCP PDU 1 from a PDCP header 1 and the PDCP SDU 1. The sending PDCP entity may deliver the PDCP PDU 1 to a sending RLC entity. The sending RLC entity may receive the PDCP PDU 1 as a RLC SDU 1. The sending RLC entity may construct a RLC PDU 1 from a RLC header 1 and the RLC SDU 1. The sending RLC entity may deliver the RLC PDU 1 to a receiving RLC entity via a MAC/PHY entity. The receiving RLC entity may receive the RLC PDU 1. The receiving RLC entity may recover the RLC SDU 1 from the RLC PDU 1 and/or may deliver the RLC SDU 1 to a receiving PDCP entity. The receiving PDCP entity may receive the RLC SDU 1 as the PDCP PDU 1. The receiving PDCP entity may recover the PDCP SDU 1 from the PDCP PDU 1 and/or may deliver the PDCP SDU 1 to a receiving SDAP entity. The receiving SDAP entity may receive the PDCP SDU 1 as the SDAP PDU 1.

In the specification, for brief description, transmission of a RLC SDU may be interpreted as transmission of a RLC PDU. In the specification, for brief description, transmission of a RLC PDU may be interpreted as transmission of a RLC SDU. If an amount of resource available in a MAC entity and/or in a PHY entity is limited, the resource may not enough to accommodate the amount of data of the RLC SDU. In that case, the RLC entity may segment the RLC SDU. For example, if the size of the RLC SDU is 100 bytes, and if the MAC entity supports maximum size of 50 bytes, then the RLC entity may segment the RLC SDU into smaller units. For example, the RLC SDU may be mapped into one or more RLC PDUs of 50 bytes. Alternatively, one or more RLC PDU segments (which are smaller than the RLC SDU and/or the RLC PDU) may be generated from the RLC SDU and/or the RLC PDU. The one or more RLC PDU segments or the one or more RLC PDUs may comprise at least a portion of the RLC SDU. This detail may complicate the description of the specification. In this specification, for the ease of description and brevity, the transmission of a RLC PDU may be interpreted as transmission of a RLC SDU. Similarly, the transmission of a RLC SDU may be interpreted as transmission of a RLC PDU. Similarly, reception of a RLC PDU may be interpreted as reception of a RLC SDU. Similarly, reception of a RLC SDU may be interpreted as reception of a RLC PDU.

In the specification, the term "AF (application function)" may be interpreted as a AS (application server), which may host and/or run one or more applications.

In the specification, the term "PDU set" may be interpreted as one or more PDUs carrying a payload of one unit of information generated at an application layer level (e.g., a frame or video slice). In some implementations all PDUs in a PDU Set may be needed by the application layer to use the corresponding unit of information. In other implementations, the application layer may be able to recover parts of the unit of information unit, when some PDUs are missing.

In the specification, the term "ADU" may be interpreted as one unit of information. The unit of information may be exchanged among one or more hosts serving an application. In an example, an application (e.g., an internet browser, an instant messaging application, a video-player application, etc.) may be running on a first host (e.g., a smartphone, computer, application server, etc.) and the same application may be running on a second host (e.g., another smartphone, computer, application server, etc.). The application on a first host may generate one or more units (e.g., a picture file, a text message, etc.) of information. Each of the one or more units of information may comprises one or more PDUs, and/or the one or more PDUs for a unit of information may be a PDU set.

In the specification, the term "PSER" may be interpreted as an upper bound for the rate of PDU sets that have been processed by the sender of an access stratum (AS) protocol (e.g., a RLC entity, a PDCP entity, and/or the like), but where all PDUs in the PDU set are not successfully delivered by the corresponding receiver. The PSER may be an upper bound for the ratio between the number of PDU sets not successfully received and the total number of PDU sets sent towards a recipient, measured over a measurement window. For example, the PSER may define an upper bound for a rate of non-congestion related packet losses. For example, based on a target PSER informed by a core network node, the NG-RAN may configure the AS protocol. For a GBR QoS Flow, a PDU set which is delayed more than PSDB may be counted as lost and included in the PSER calculation unless the QoS flow is exceeding the GFBR. The PSER may a ratio between a number of PDU sets successfully delivered to a receiver to a number of PDU sets that a sender needs to deliver to the receiver.

In the specification, the term "PSDB" may be interpreted as an upper bound for the time that a PDU set may be delayed between the UE and the N6 termination point at the UPF before being considered as not successfully delivered. The PSDB may define an upper bound for a time that a PDU set may be delayed between the UE and the N6 termination point at the UPF. For example, the target PSDB (required PSDB, PSDB sent by the SMF) may be set to 100 ms. For example, a PDU set may comprise a first PDU and a second PDU. The first PDU may arrive at a UPF at t1=0 ms, and/or the second PDU may arrive at the UPF at t2=10 ms. The UE may receive the first PDU at t3=50. The UE may receive the second PDU at t4=110 ms. For the PDU set, the achieved PDU set delay may be t4 (a delivery time of last PDU of the PDU set) minus t1 (an arrival time of first PDU of the PDU set), which is 110 ms (110 ms-0 ms). In this case the achieved PSDB (which is 110 ms) is beyond the target PSDB, and QoS requirement is not fulfilled.

Figure 19:
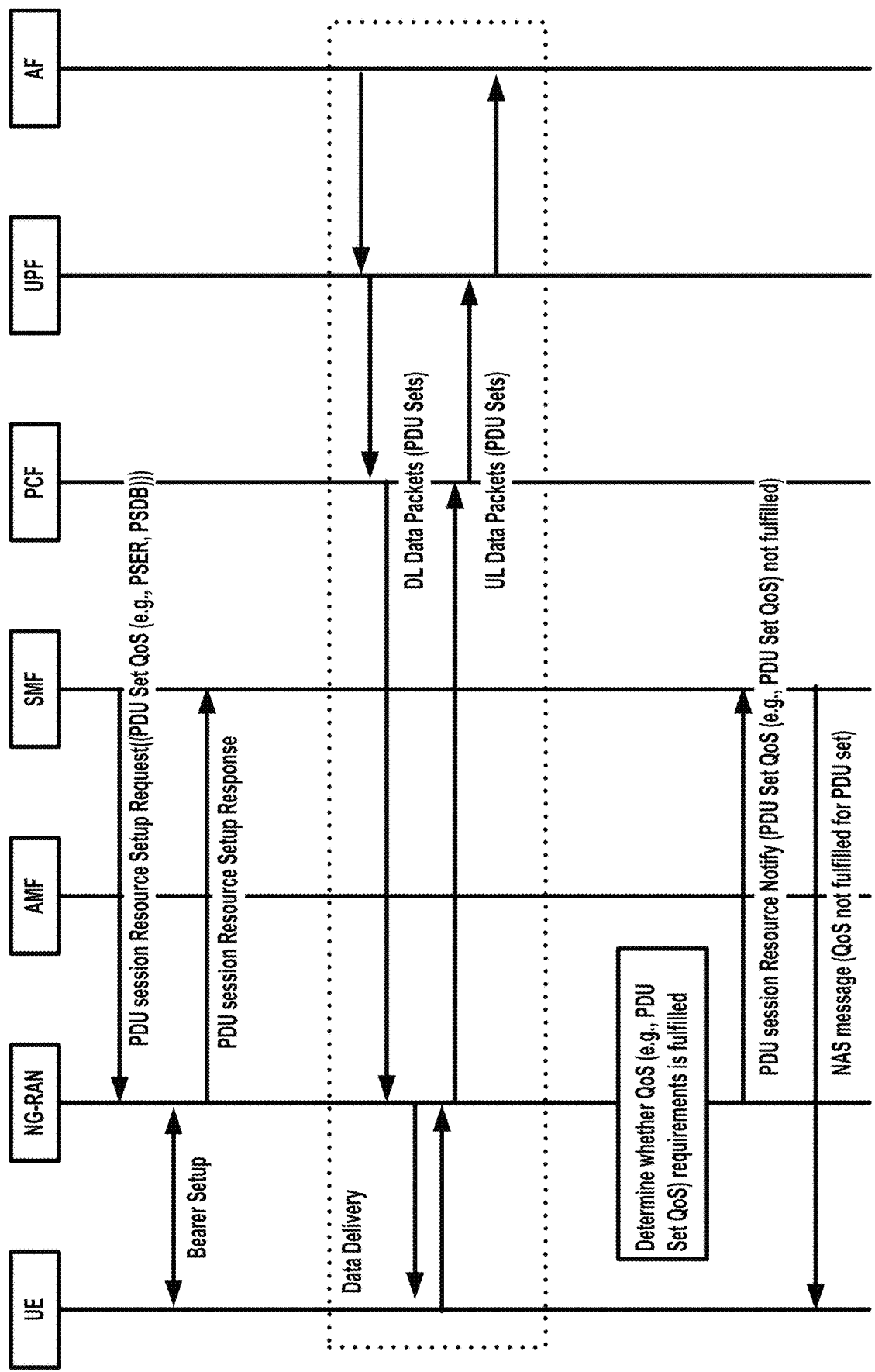
FIG. 19 is a diagram of an aspect of an example embodiment of the present disclosure.

FIG. 19 may depict one example embodiment of the present disclosure. By informing whether QoS requirement for a QoS flow of one or more PDU sets is fulfilled or not, a core network node (e.g., a SMF) may be able to adjust QoS configuration for the QoS flow.

In an example, a SMF may send a first N2 SM container via an AMF, to a NG-RAN, to setup one or more QoS flows for one or more PDU sessions. The first N2 SM container may be a PDU session resource setup request transfer, a PDU session resource modify request transfer, and/or the like. The first N2 SM container may comprise at least one of:
   PDU session aggregation maximum bit rate: This may indicate a maximum bit rate allowed for a PDU session.
   UL NG-U UP TNL information: This may indicate an endpoint of a UPF.
   QoS flow list: This may comprise one or more QoS flow request items to setup the one or more QoS flows. This may be a QoS flow setup request list, a QoS flow add or modify request list, and/or the like.

In an example, the QoS flow request item of the one or more QoS flow request items may comprise at least one of:
   QoS flow identifier: This may indicate an identifier of a QoS flow.
   QoS flow level QoS parameter. This may comprise one or more configuration parameters for the QoS flow.

In an example, the QoS flow level QoS parameter may comprise at least one of:
   QoS characteristic. This may indicate QoS requirement for the QoS flow. This may be a non-dynamic 5QI descriptor, dynamic 5QI descriptor, and/or the like, for the QoS flow. For example, for the QoS flow, the QoS characteristic may comprise at least one of a 5QI, a priority level, a PDB, a PER, a PSDB (e.g., first PSDB), a PSER (e.g., first PSER), and/or the like. For example, the PSDB and/or the PSER may assist the NG-RAN to determine when to stop retransmission for one or more PDUs of a PDU set and/or when to stop retransmission for the PDU set. For example, the NG-RAN may determine when to perform retransmission or not based on the PDU set information of each PDU and/or the PSER and/or the PSDB.
   GBR QoS flow information: This may indicate QoS requirement for the QoS flow. This may comprise at least one of a guaranteed flow bit rate (GFBR), one or more alternative QoS parameters set items. An alternative QoS parameters set item of the one or more alternative QoS parameters set items may comprise at least one of an alternative QoS parameters set index, a GFBR downlink, a GFBR uplink, a PDB, a PER, a PSER, a PSDB, and/or the like. This may comprise a notification control information. The notification control information may indicate whether the NG-RAN needs to send a report (e.g., the third N2 SM container (described below). For example, when the QoS requirement is not met for the QoS flow, if the notification control information indicates notification requested, the NG-RAN may send the report.

In an example, the NG-RAN may receive the first N2 SM container. Based on the N2 SM container, the NG-RAN may configure one or more bearers with the UE. For example, based on the PSER (or target PSER, first PSER, and/or the like) and/or the PSDB (or target PSDB, first PSER, and/or the like) for the QoS flow in the first N2 SM container, the NG-RAN may configure one or more bearers for the UE. For example, the NG-RAN may send a RRC message comprising configuration information of the one or more bearers.

In an example, in response to the first N2 SM container, the NG-RAN may send a second N2 SM container, to the SMF. The second N2 SM container may be a PDU session resource setup response transfer, a PDU session resource modify response transfer, and/or the like.

In an example, the SMF may receive the second N2 SM container sent by the NG-RAN.

In an example, an AF and/or the UE may exchange one or more PDUs (e.g., data packets, packets, ADUs, and/or the like) over the QoS flow. The one or more PDUs may comprise one or more DL PDUs and/or one or more UL PDUs. The one or more PDUs may comprise one or more PDU sets.

In an example, the UPF may send the one or more PDUs to the NG-RAN, with one or more PDU set information associated with the one or more DL data packets. The NG-RAN may receive the one or more PDUs with the one or more PDU set information. Using the one or more PDU set information associated with the one or more DL PDUs, the NG-RAN may determine a PDU set to which each of the one or more DL PDUs is associated with. The NG-RAN may send to the UE, the one or more DL PDUs.

In an example, the UE may send the one or more UL PDUs to the NG-RAN, with one or more PDU set information associated with the one or more UL PDUs. The NG-RAN may receive the one or more UL PDUs with the one or more PDU set information. Using the one or more PDU set information associated with the one or more UL PDUs, the NG-RAN may determine a PDU set to which each of the one or more UL PDUs is associated with. The NG-RAN may send to the UPF, the one or more UL PDUs.

In an example, the NG-RAN may monitor (or calculate, determine, measure, and/or the like) a second PSER (or achieved PSER, provided PSER, current PSER, fulfilled PSER, second PSER, and/or the like) and/or a second PSDB (or achieved PSDB, provided PSDB, current PSDB, fulfilled PSDB, second PSDB, and/or the like).

For example, the NG-RAN may receive from the UPF, a number (e.g., X1) of PDU sets. The NG-RAN may attempt to send to the UE, one or more PDUs of the X1 PDU sets. Out of the X1 PDU sets, the UE may successfully receive a number (e.g., X2) of PDU sets. Out of the X1 PDU sets, the UE may not receive a number (e.g., X3=(X1-X2) of PDU sets. The NG-RAN may determine (monitor, calculate, measure) the second PSER, based on the X1, X2 and/or X3. For example, the second PSER may be a ratio (X4) of the X1 to the X3.

For example, the NG-RAN may receive from the UPF, a number (e.g., Y1) of PDU sets. For a PDU set (e.g., PDU set Y) of the Y1 PDU sets, the NG-RAN may record the time (e.g., t=Ya1) when the PDU set Y is received. The time t=Ya1 may be a time when a first PDU of the PDU set Y is received and/or a time when the last of the PDU set Y is received. The NG-RAN may attempt to send to the UE, one or more PDUs of the Y1 PDU sets. For example, for the PDU set Y, the NG-RAN may record the time (e.g., t=Ya2)

when the PDU set Y is delivered to the UE. For example, the time t=Ya2 may be a time when the last PDU of the PDU set Y is delivered to the UE. Based on the Ya1 and/or Ya2 measured for each PDU set of the Y1 PDU sets, the NG-RAN may determine (monitor, calculate, measure) the second PSDB. For example, the second PSDB may an average value of the Ya2 minus Ya1.

In an example, using similar mechanism as described above, the NG-RAN may determine (monitor, calculate, measure) the second PSER and/or the second PSDB for the one or more UL PDU sets. For example, using on the second PSER, the first PSER, the second PSDB and/or the first PSDB, the NG-RAN may determine which PDU of which PDU set needs to be retransmitted, discarded, and/or the like.

In an example, the NG-RAN may determine whether the achieved (second, provided, fulfilled, current) PSER and/or the achieved (second, provided, fulfilled, current) PSDB meets the QoS requirements (e.g., the first PSER, first PSDB, and/or the like). The NG-RAN may compare the second PSER with the first PSER. For example, If the second PSER (e.g., 10%) is larger than the first PSER (e.g., 5%), the NG-RAN may determine that the QoS requirement is not met. For example, If the second PSER (e.g., 2%) is smaller than the first PSER (e.g., 4%), the NG-RAN may determine that the QoS requirement is met (fulfilled). The NG-RAN may compare the second PSDB with the first PSDB. For example, If the second PSDB (e.g., 30 ms) is larger than the first PSER (e.g., 20 ms), the NG-RAN may determine that the QoS requirement is not met. For example, If the second PSDB (e.g., 5 ms) is smaller than the first PSER (e.g., 10%), the NG-RAN may determine that the QoS requirement is met (fulfilled).

In an example, based on the determination of whether QoS requirement is met, the NG-RAN may determine whether to send a third N2 SM container or not. For example, when the QoS requirement is not met, the NG-RAN may send the third N2 SM container which indicates that QoS requirement is not met (fulfilled). For example, when the QoS requirement is met, the NG-RAN may or may not send the third N2 SM container which indicates that QoS requirement for one or more PDU sets is met (fulfilled). For example, the third N2 SM container may be a PDU session resource notify transfer and/or the like. For example, the third N2 SM container may comprise one or more QoS flow notify items. A QoS flow notify item of the one or more QoS flow notify items may comprise at least one of:

QoS flow identifier
    Notification cause: This may indicate whether QoS requirement is met or not. For example, this may indicate 'fulfilled' when the QoS requirement is met. For example, this may indicate 'not fulfilled' when the QoS requirement is not met.
    Current QoS Parameter set index: This may indicate an alternative QoS parameters set index indicating an alternative QoS parameter, which the NG-RAN provides to the UE.
    List of QoS flow released by the NG-RAN: This may indicate one or more QoS flows which are released by the NG-RAN. For example, the NG-RAN may release one or more QoS flows which the NG-RAN may not be able to support the first PSER and/or the first PSDB.

In an example, the SMF may receive the third N2 SM container sent by the NG-RAN. Based on the third N2 SM container, the SMF may determine whether the QoS requirement for the one or more PDU sets are met (fulfilled) or not. For example, the SMF may receive the third N2 SM container which indicates that QoS requirement is not met (fulfilled). Based on the third N2 SM container, the SMF may determine that PDU set level QoS requirement is not met (fulfilled), that a GFBR is not fulfill for the QoS flow, and/or the like. For example, 'not fulfilled' may be 'unfulfilled', 'unsatisfied', 'unachievable', and/or the like.

In an example, the second N2 SM container may comprise the indication that QoS requirement is not met (fulfilled). For example, when the NG-RAN receives the first N2 SM container, the NG-RAN may determine whether the first PSER and/or the first PSDB can be met (fulfilled) or not. For example, if the NG-RAN is congested due to serving many other UEs, or based on statistics information, the NG-RAN may be able to determine whether the NG-RAN can fulfill the first PSER and/or the first PSDB. In this case, the NG-RAN may send the second N2 SM container indicating that the QoS requirement for one or more PDU sets is not met.

Figure 23:
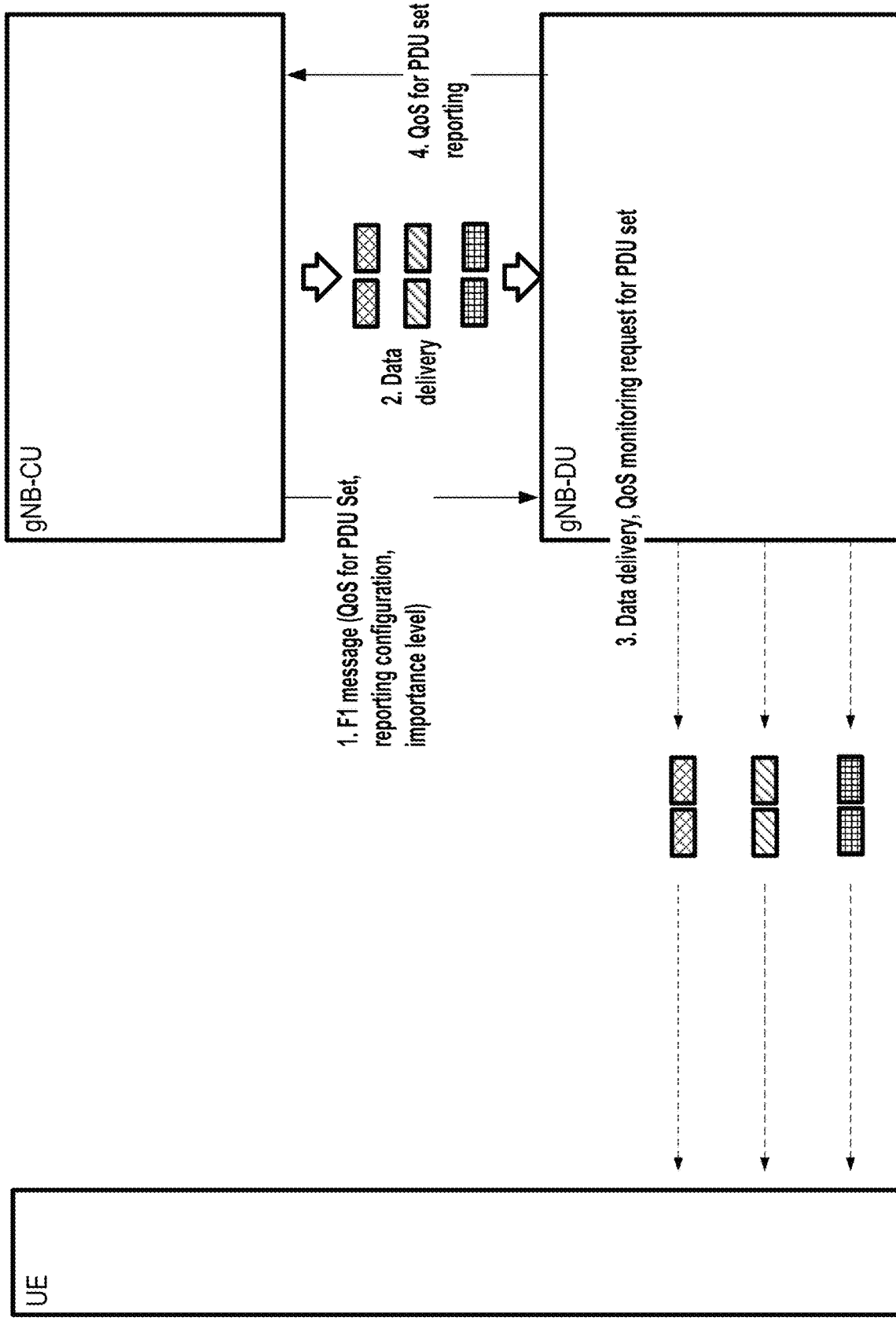
FIG. 23 is a diagram of an aspect of an example embodiment of the present disclosure.

In an example, the NG-RAN may comprise a gNB-DU and/or a gNB-CU. In this case, the gNB-CU may handle the message exchange with the SMF as described earlier and/or the gNB-DU may determine the provided (achieved) QoS for the one or more PDU sets. For example, the gNB-CU may send to the gNB-DU, as shown in the FIG. 23, a F1 message to the gNB-DU. For example, the F1 message may comprise the QoS flow level QoS parameter, the one or more QoS flow request items, and/or the like. For example, based on the F1 message, the gNB-DU may monitor whether the QoS requirements for the one or more PDU sets are fulfilled or not. Based on the monitoring, the gNB-DU may send a second F1 message to the gNB-CU. The second F1 message may comprise an indication whether the QoS requirement for the one or more PDU sets are met or not. As described earlier for the NG-RAN, based on the monitoring, the gNB-DU may send another F1 message to the gNB-CU.

In an example, based on the third N2 SM container, the SMF may send a NAS message to the UE. The NAS message may inform the UE of the change in the QoS parameters (or QoS profile, QoS rule, and/or the like) for the QoS flow (or the PDU session) delivering the one or more PDU sets. For example, the change in the QoS parameters may be a change in the PSER, and/or a change in the PSDB. For example, the NAS message may indicate the QoS (e.g., PSER, PSDB) that the NG-RAN currently fulfills for the QoS flow transporting the one or more PDU sets. For example, the NAS message may indicate a (updated/modified) target QoS (e.g., PSER, PSDB) for the QoS flow transporting the one or more PDU sets. For example, the NAS message may indicate that QoS (e.g., PSER, PSDB) is not fulfilled for the QoS flow, for the one or more PDU sets. In other words, the NAS message may indicate the UE whether the QoS requirement (or alternative QoS requirements) based on PDU set is met (fulfilled) or not. For example, the NAS message may indicate a 5QI which may indicate a first QoS requirements that the UE requests. For example, the NAS message may comprise a second 5QI which may indicate a QoS parameters that the SMF accepts and/or which the network currently provides to the UE.

Figure 20:
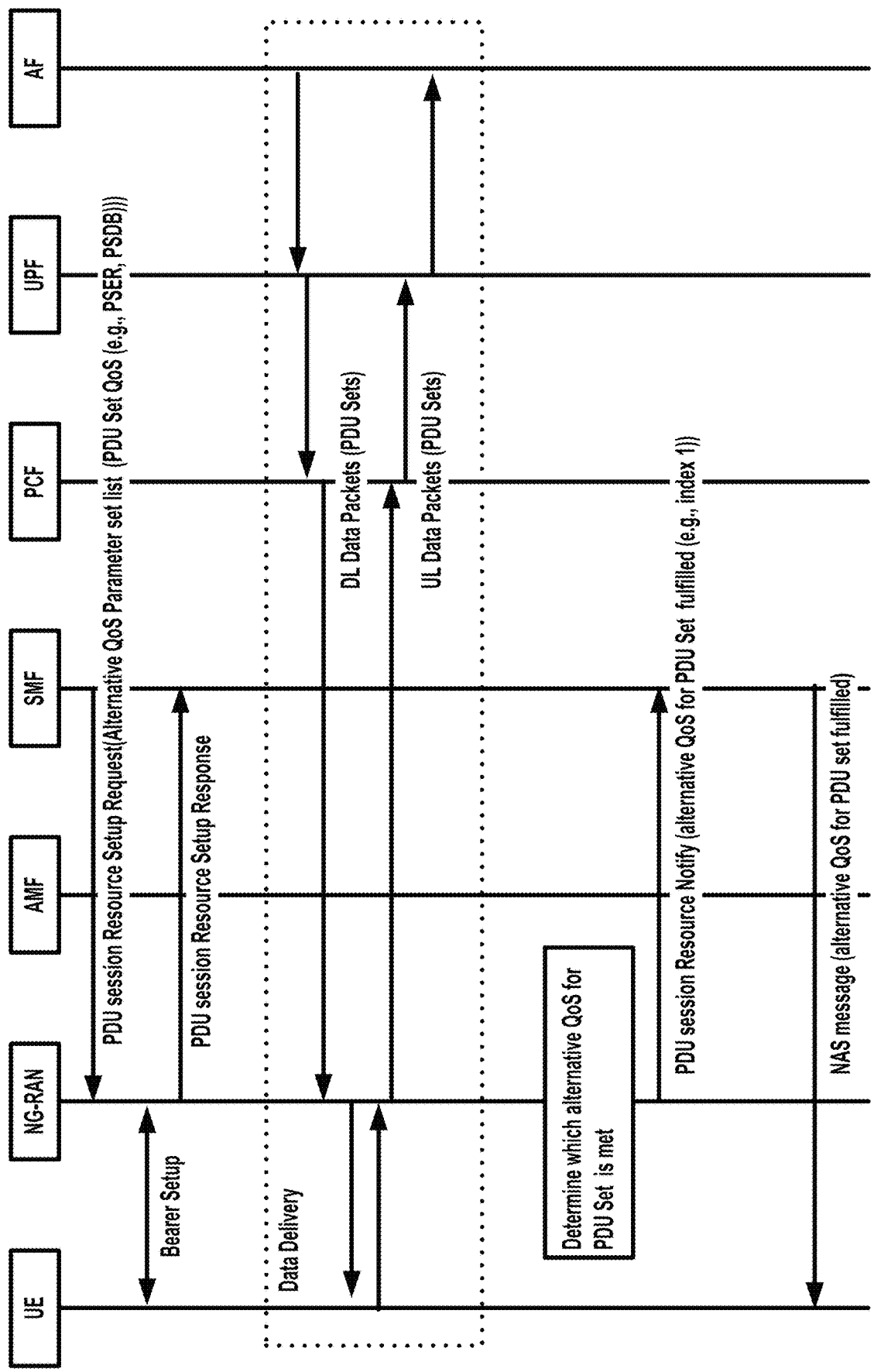
FIG. 20 is a diagram of an aspect of an example embodiment of the present disclosure.

FIG. 20 may depict one example embodiment of the present disclosure. Similar to the previous figure (e.g., FIG. 19), by informing whether alternative QoS requirement for the QoS flow of one or more PDU sets is fulfilled or not and/or by informing currently fulfilled alternative QoS parameters set index, the core network node (e.g., a SMF) may be able to adjust QoS configuration for the QoS flow. For brevity, redundant details will be omitted.

In an example, the SMF may send the first N2 SM container via the AMF, to the NG-RAN, to setup/modify one or more QoS flows for one or more PDU sessions. The first N2 SM container may comprise at least one of:
PDU session aggregation maximum bit rate.
UL NG-U UP TNL information.
QoS flow list. This may comprise the one or more QoS flow request items.

In an example, the QoS flow request item of the one or more QoS flow request items may comprise at least one of:
QoS flow identifier.
QoS flow level QoS parameter.

In an example, the QoS flow level QoS parameter may comprise at least one of:
QoS characteristic. This may comprise the first PSDB, the first PSER.
GBR QoS flow information: This may indicate QoS requirement for the QoS flow. This may comprise at least one of a guaranteed flow bit rate (GFBR), one or more alternative QoS parameters set items. The one or more alternative QoS parameters set items may indicate one or more alternative QoS requirements. An alternative QoS parameters set item of the one or more alternative QoS parameters set items may comprise at least one of an alternative QoS parameters set index, a GFBR downlink, a GFBR uplink, a PDB, a PER, a PSER, a PSDB, and/or the like. The alternative QoS parameters set index may indicate an associated set of parameters (e.g., a GFBR downlink, a GFBR uplink, a PDB, a PER, a PSER, a PSDB and/or the like).

In an example, the one or more alternative QoS parameters set items may comprise a first alternative QoS parameters set (or set item), a second alternative QoS parameters set (or set item), and/or a third alternative QoS parameters set (or set item). For example, the first alternative QoS parameters set may comprise a first alternative QoS parameters set index (e.g., alternative QoS parameters set 1, index 1, and/or the like), a first alternative GFBR downlink (e.g., 10 Mbps), a first alternative GFBR uplink (e.g., 5 Mbps), a first alternative PSER (e.g., 1%), a first alternative PSDB (e.g., 30 ms). The first alternative QoS parameters set index may indicate the first alternative GFBR downlink, the first alternative GFBR uplink, the first alternative PSER and/or the first alternative PSDB. For example, the second alternative QoS parameters set may comprise a second alternative QoS parameters set index (e.g., alternative QoS parameters set 2, index 2, and/or the like) may indicate a second alternative GFBR downlink (e.g., 5 Mbps), a second alternative GFBR uplink (e.g., 3 Mbps), a second alternative PSER (e.g., 2%), a second alternative PSDB (e.g., 50 ms). The second alternative QoS parameters set index may indicate the second alternative GFBR downlink, the second alternative GFBR uplink, the second alternative PSER and/ or the second alternative PSDB. For example, the third alternative QoS parameters set may comprise a third alternative QoS parameters set index (e.g., alternative QoS parameters set 3, index 3, and/or the like) may indicate a third alternative GFBR downlink (e.g., 10 Mbps), a third alternative GFBR uplink (e.g., 1 Mbps), a third alternative PSER (e.g., 1%), a third alternative PSDB (e.g., 40 ms). The third alternative QoS parameters set index may indicate the third alternative GFBR downlink, the third alternative GFBR uplink, the third alternative PSER and/or the third alternative PSDB.

In an example, the NG-RAN may receive the first N2 SM container. Based on the N2 SM container, the NG-RAN may configure one or more bearers with the UE.

In an example, in response to the first N2 SM container, the NG-RAN may send a second N2 SM container, to the SMF.

In an example, the SMF may receive the second N2 SM container sent by the NG-RAN.

In an example, an AF and/or the UE may exchange one or more PDUs (e.g., data packets, packets, ADUs, and/or the like) over the QoS flow. The one or more PDUs may comprise one or more DL PDUs (DL data packets) and/or one or more UL PDUs (UL data packets). The one or more PDUs may comprise one or more PDU sets.

In an example, the UPF may send the one or more PDUs to the NG-RAN, with one or more PDU set information associated with the one or more PDUs. The NG-RAN may receive the one or more PDUs with the one or more PDU set information.

In an example, the UE may send the one or more UL PDUs to the NG-RAN, with one or more PDU set information associated with the one or more UL PDUs. The NG-RAN may receive the one or more UL PDUs with the one or more PDU set information.

In an example, the NG-RAN may monitor (or calculate, determine, measure, and/or the like) the second PSER (or achieved PSER, provided PSER, current PSER, fulfilled PSER, and/or the like) and/or the second PSDB (or achieved PSDB, provided PSDB, current PSDB, fulfilled PSDB, second PSDB, and/or the like).

In an example, the NG-RAN may determine that the NG-RAN may not fulfill the QoS requirement (e.g., the first PSER and/or the first PSDB) indicated by the first N2 SM container. Based on that the NG-RAN may not be able to provide (fulfill) the QoS requirement (e.g., the first PSER and/or the first PSDB), the NG-RAN may determine whether the NG-RAN can provide (fulfill) one of the alternative QoS parameters set items (e.g., one or more alternative QoS requirements). For example, the NG-RAN may determine whether the NG-RAN can fulfill the first alternative QoS parameters set (e.g., the first alternative PSER, the first alternative PSDB). If the NG-RAN determines that the NG-RAN can not fulfill the first alternative QoS parameter set, the NG-RAN may determine whether the NG-RAN can fulfill the second alternative QoS parameter set. For example, based on the monitored (determined, achieved, fulfilled) second PSER and/or the monitored second PSDB, the NG-RAN may determine whether the NG-RAN can support the one of the one or more alternative QoS parameters set items.

In an example, the NG-RAN may determine that the NG-RAN may fulfill one of the one or more alternative QoS parameters set items. For example, the NG-RAN may determine that the NG-RAN can fulfill one of the alternative QoS requirements (e.g., the first alternative PSER, the first alternative PSDB, the first alternative QoS parameters set).

In an example, based on the determination that the NG-RAN cannot fulfill the QoS requirement (e.g., the first PSER, the first PSDB), and/or based on that the NG-RAN can fulfill the one of the one or more alternative QoS parameters set, the NG-RAN may determine to send the third N2 SM container. The third N2 SM container may indicate that QoS requirement (e.g., the first PSDB, the first PSER) for one or more PDU sets is not met (fulfilled) and/or that the NG-RAN can currently fulfill the one or more alternative QoS parameters set for one or more PDU sets. For example, the NG-RAN may send the third N2 SM container if the NG-RAN is requested to send notification control by the SMF.

For example, the third N2 SM container may comprise the one or more QoS flow notify items. The QoS flow notify item of the one or more QoS flow notify items may comprise at least one of:

QoS flow identifier.

Notification cause.

Current QoS Parameter set index: This may indicate an alternative QoS parameters set index indicating an alternative QoS parameters set, which the NG-RAN can currently provide to the UE and/or which the NG-RAN can currently fulfill. For example, the current QoS parameter set index may be the first alternative QoS index (e.g., index 1) and/or the like.

In an example, the SMF may receive the third N2 SM container sent by the NG-RAN. Based on the third N2 SM container, the SMF may determine whether the QoS requirement for the one or more PDU sets are met (fulfilled) or not. For example, the SMF may receive the third N2 SM container which indicates that QoS requirement is not met (fulfilled), that one (e.g., the first alternative QoS parameters set) of the one or more alternative QoS parameters set can be fulfilled (met, provided), and/or that the NG-RAN currently provides the first alternative QoS parameters set (e.g., the first alternative QoS index). Based on the third N2 SM container, the SMF may determine that PDU set level QoS requirement (e.g., based on the first PSDB, the first PSER) is not met (fulfilled), and/or that the first alternative QoS parameters set (e.g., first alternative QoS requirement) is currently fulfilled, and/or the like.

In an example, the second N2 SM container may comprise the information of the first alternative QoS parameter set and/or Current QoS Parameter set index (e.g., the first alternative QoS parameter set index). For example, when the NG-RAN receives the first N2 SM container, the NG-RAN may determine whether the first PSER and/or the first PSDB can be met (fulfilled) or not, and/or whether one of the one or more alternative QoS parameters set can be fulfilled. For example, if the NG-RAN is congested due to serving many other UEs, or based on statistics information, the NG-RAN may be able to determine that the NG-RAN can fulfill the first alternative QoS parameters set when it receives the first N2 SM container. In this case (e.g., during the PDU session resource establishment procedure), the NG-RAN may send the second N2 SM container indicating that the first alternative QoS parameters set is fulfilled and/or that the PDU set level QoS requirement (e.g., based on the first PSDB, the first PSER) is not met (fulfilled).

In an example, the SMF may receive the third N2 SM container. Based on the third N2 SM container, the SMF may send a NAS message to the UE. The NAS message may inform the UE of the change in the QoS parameters (or QoS profile, QoS rule, and/or the like) for the QoS flow (or the PDU session) delivering the one or more PDU sets. For example, the change in the QoS parameters may be the alternative QoS parameters set that the network currently fulfills for the QoS flow of the one or more PDU sets. For example, the NAS message may indicate the QoS (e.g., PSER, PSDB) that the NG-RAN currently fulfills for the QoS flow transporting the one or more PDU sets. For example, the NAS message may indicate a (updated/modified) target QoS (e.g., PSER, PSDB) for the QoS flow transporting the one or more PDU sets. For example, the NAS message may indicate that QoS (e.g., PSER, PSDB) is not fulfilled for the QoS flow, for the one or more PDU sets. In other words, the NAS message may indicate the UE whether the QoS requirement (or alternative QoS requirements) based on PDU set is met(fulfilled) or not. For example, the NAS message may indicate a 5QI which may indicate a first QoS requirements that the UE requests. For example, the NAS message may comprise a second 5QI which may indicate a QoS parameters that the SMF accepts and/or which the network currently provides to the UE.

Figure 21:
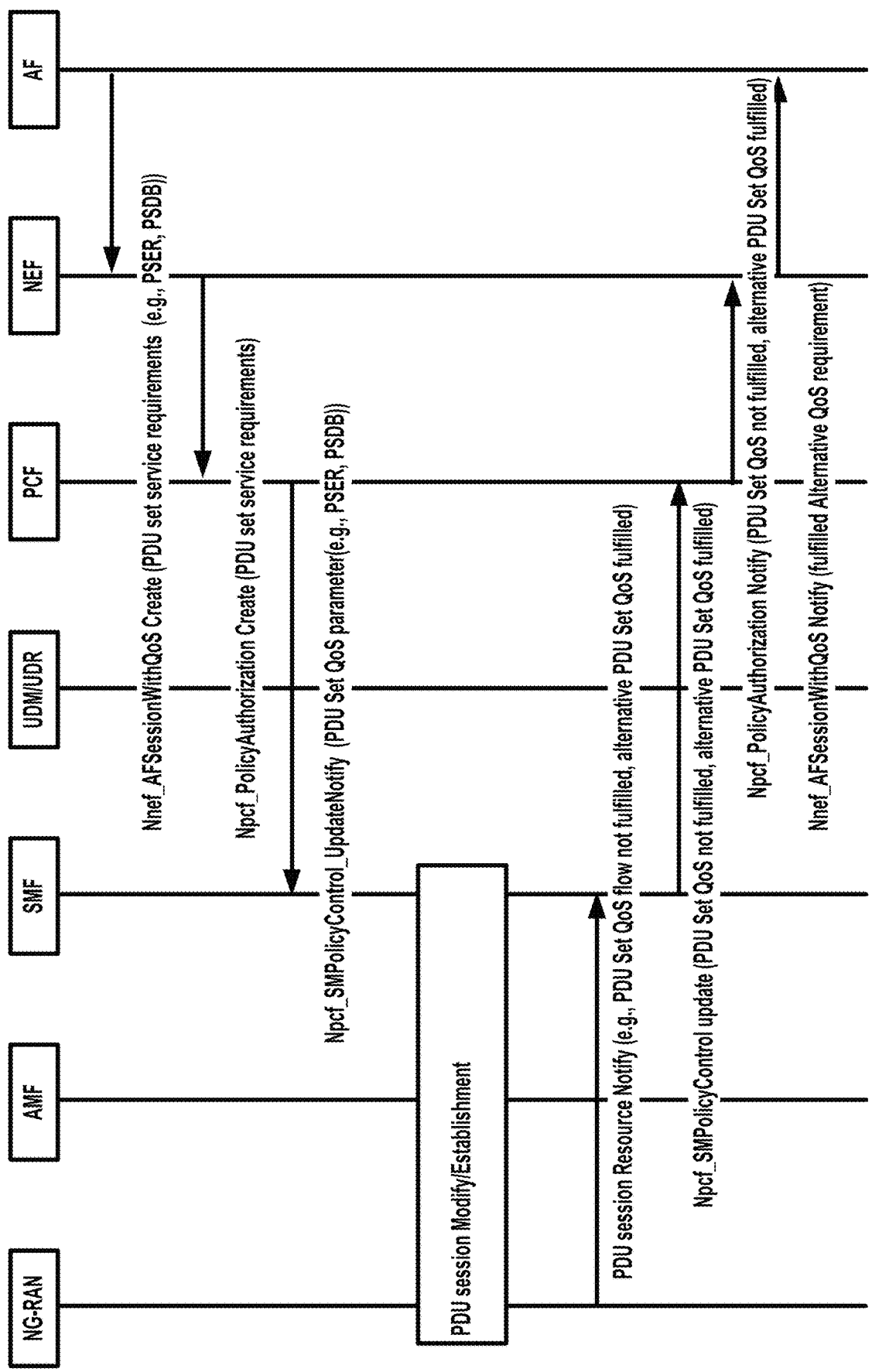
FIG. 21 is a diagram of an aspect of an example embodiment of the present disclosure.

FIG. 21 may depict one example embodiment of the present disclosure. Similar to the previous figure (e.g., FIG. 19, FIG. 20), the NG-RAN may send to the SMF, one or more messages indicating whether the QoS requirement (e.g., QoS profile, QoS parameters set) for the one or more PDU sets is fulfilled or not and/or by informing currently fulfilled alternative QoS parameters (e.g., alternative QoS requirement) for the QoS flow delivering the one or more PDU sets. In the FIG. 21, the core network node (e.g., a SMF) may be able to get information on service requirements. For brevity, redundant details will be omitted.

In an example, the AF may send a Nnef service request message to a NEF, to request a network to provide a specific QoS for the AF. For example, the Nnef service request message may be a Nnef_AFSessionWithQoS Create message and/or the like. The Nnef service request message may comprise at least one of:

AF identifier: This may indicate an identity of the AF

UE address: This may indicate an IP address and/or MAC address to which the Nnef_AFSessionWithQoS Create applies. Based on the IP address and/or MAC address, the network may be able to identify a UE to which the Nnef service request applies.

QoS information: This may be at least one of a QoS reference, alternative service (QoS) requirements, QoS parameters to be measured, individual QoS parameters, and/or alternative QoS related parameter sets. This may indicate the specific QoS (e.g., service requirements, QoS requirements, and/or alternative QoS requirements) that the AF requests for a service flow delivering the one or more PDU sets. This may be a PDU set level service requirement. For example, based on the QoS information, a network node (e.g., a PCF) may derive one or more QoS parameters of a PCC rule.

In an example, the QoS information may comprise at least one:

A requested priority. For example, this may indicate whether prioritized treatment for the UE is required.

A maximum burst size. This may indicate a maximum burst size of traffic associated with the one or more PDU sets.

A requested 5GS delay. This may indicate an allowed delay in 5G system for delivery of the traffic. For example, the 5G system may be required to deliver a data within the requested 5GS delay.

A requested maximum bitrate. This may indicate a maximum bitrate for the traffic.

A requested guaranteed bit rate. This may indicate a guaranteed bit rate for the traffic.

Alternative service requirements. This may be one or more QoS reference parameters, one or more requested alternative QoS parameter sets. The one or more QoS reference parameters may indicate the one or more alternative QoS parameter sets. For example, the alternative service requirements may indicate one or more alternative QoS requirements for a flow (e.g., a service data flow, a data flow, a QoS flow, and/or the like) delivering the one or more PDU sets. For example, the alternative service requirements may comprise at least one or more PSERs (e.g., target PSERs, required PSERs), one or more PSDBs (e.g., target PSDBs, required PSDBs) for the flow.

In an example, the NEF may receive the Nnef service request message sent by the AF. The NEF may determine whether to authorize the Nnef service request from the AF. If the NEF determines to authorize the Nnef service request, the NEF may send a first Npcf service request message to the PCF. For example, the first Npcf service request message may be a Npcf_PolicyAuthorization Create message, and/or the like. For example, the first Npcf service request message may comprise at least one of:
- the UE address.
- the AF identifier.
- the QoS information.

In an example, the PCF may receive the first Npcf service request from the NEF. Based on information of the first Npcf service request, the PCF may derive/update QoS settings (e.g., QoS parameters, QoS rules, QoS profiles, PCC rules). For example, the derived/updated QoS settings may comprise at least one of:
- 5G QoS characteristics: This may indicate at least one of a resource type (e.g., GBR, non-GBR), a default priority level, a PDB, a PER, a PSER, a PSDB, and/or the like. For example, this may be a PDU set QoS parameter.
- Flow bit rate.
- Aggregate bit rate.
- Alternative QoS parameter sets. For example, this may be one or more sets. Each set of the one or more sets may comprise at least one of the 5G QoS characteristics, a flow bit rate, an aggregate bit rate, and/or the like. The alternative QoS parameters sets may comprise one or more alternative QoS parameter set(s). For example, the alternative QoS parameters sets may comprise the first alternative QoS parameter set, the second alternative QoS parameter set, and/or the third alternative QoS parameter set. The alternative QoS parameter sets may indicate one or more sets of requirements for the flow delivering the one or more PDU sets. For example, the alternative QoS parameter sets may be an alternative QoS profiles.

In an example, the PCF may send a second Npcf service request message to the SMF. For example, the PCF may send the derived/updated QoS settings to the SMF, via the Npcf service request.

In an example, the SMF may receive the second Npcf service request message sent by the SMF. Based on the information of the second Npcf service request message, the SMF may update/modify the PDU session for the UE, may send the first N2 SM container to the NG-RAN.

In an example, the NG-RAN may receive the first N2 SM container from the SMF. Based on the information of the first N2 SM container, the NG-RAN may update/establish/modify the one or more bearers for the UE, may monitor whether the QoS requirement (or QoS parameters, QoS profile, and/or the like) for the flow of the one or more PDU set is fulfilled or not, may determine whether the one or more alternative QoS parameters sets (alternative QoS requirements) for the one or more PDU sets are fulfilled or not.

In an example, the NG-RAN may send the third N2 SM container to the SMF. For example, the third N2 SM container may indicate whether the QoS requirement (or QoS parameters, QoS profile, and/or the like) associated with the one or more PDU sets is met (fulfilled) or not, whether alternative QoS requirement (e.g., alternative QoS parameter sets) associated with the flow for the one or more PDU sets is met (fulfilled) or not. For example, the NG-RAN may send the third N2 SM container, if the NG-RAN determines that the first PSER and/or the first PSDB of the QoS flow cannot be fulfilled for the QoS flow, the NG-RAN may send a notification (e.g., the third N2 SM container) to the SMF. For example, the NG-RAN may check whether the second PSER and/or the second PSDB that the NG-RAN currently fulfils matches an alternative QoS profile of the one or more alternative QoS profiles (e.g., QoS parameters sets). If there is a match, the NG-RAN may send the notification the SMF. For example, the notification to the SMF may indicate the alternative QoS profile. For example, if the currently fulfilled alternative QoS profile (e.g., alternative QoS parameters set) is different from the previously sent (notified) alternative QoS profile (to the SMF), the NG-RAN may send the notification.

For example, the third N2 SM container may comprise at least one of:
- indication that the GFBR can no longer be guaranteed.
- indication that the GFBR can be guaranteed again. For example, this indication may be sent if radio condition between the UE and the NG-RAN improves after the NG-RAN sends to the SMF the indication that the GFBR can no longer be guaranteed.
- indication that the QoS profile (parameters set, e.g., the target PSER/PSDB, the first PSER/PSDB) can be fulfilled.
- indication that the QoS profile (parameters set, e.g., the target PSER/PSDB, the first PSER/PSDB) cannot be fulfilled.
- indication that alternative QoS profile (parameters set) can be fulfilled
- index of currently fulfilled alternative QoS profile (parameters set).

In an example, the SMF may receive the third N2 SM container sent by the NG-RAN. The third N2 SM container may assist for the SMF to estimate currently provided QoS for the one or more PDU sets.

In an example, based on the third N2 SM container, the SMF may determine to send a third Npcf service request message to the PCF. For example, the third Npcf service request message may be a Npcf_SMPolicyControl update message, and/or the like. The third Npcf service request message may comprise at least one of:
- indication that the GFBR can no longer be guaranteed.
- indication that the GFBR can be guaranteed again.
- indication that the QoS profile (parameters set) can be fulfilled.
- indication that alternative QoS profile (parameters set) can be fulfilled
- index of currently fulfilled alternative QoS profile (parameters set).

In an example, the PCF may receive the third Npcf service request message sent by the SMF. Based on the third Npcf service request message, the PCF may send a fourth Npcf service request message to the NEF. For example, the fourth Npcf service request message may be a Npcf_PolicyAuthorization Notify, and/or the like. The fourth Npcf service request message may comprise at least one of:
- indication that the GFBR can no longer be guaranteed.
- indication that the GFBR can be guaranteed again
- indication that the QoS profile (parameters set) can be fulfilled.
- indication that alternative QoS profile (parameters set) can be fulfilled
- index of currently fulfilled alternative QoS profile (parameters set).

In an example, the NEF may receive the fourth Npcf service request message. Based on the fourth Npcf service request message, the NEF may send a second Nnef service request message to the AF. For example, the second Nnef service request message may be Nnef_AFSessionWithQoS Notify message. The second Nnef service request message may indicate to the AF whether the service requirement (e.g., QoS requirement and/or alternative QoS requirements) based on a PDU set is met or not. The second Nnef service request message may comprise at least one of:

indication that the GFBR (the service requirement, the service reference, the QoS reference) can no longer be guaranteed.

indication that the GFBR (the service requirement, the service reference, the QoS reference) can be guaranteed again indication that the service requirement can be fulfilled.

indication that alternative QoS (service requirement) is fulfilled indication that an alternative service requirement is met.

information (index) of an alternative QoS reference (currently fulfilled).

In an example, based on the third N2 SM container, the SMF may send a NAS message to the UE. The NAS message may inform the UE of the change in the QoS parameters (or QoS profile, QoS rule, and/or the like) for the QoS flow (or the PDU session) delivering the one or more PDU sets. For example, the change in the QoS parameters may be a change in the PSER, and/or a change in the PSDB. For example, the NAS message may indicate the QoS (e.g., PSER, PSDB) that the NG-RAN currently fulfills for the QoS flow transporting the one or more PDU sets. For example, the NAS message may indicate a (updated/modified) target QoS (e.g., PSER, PSDB) for the QoS flow transporting the one or more PDU sets. For example, the NAS message may indicate that QoS (e.g., PSER, PSDB) is not fulfilled for the QoS flow, for the one or more PDU sets. In other words, the NAS message may indicate the UE whether the QoS requirement (or alternative QoS requirements) based on PDU set is met (fulfilled) or not. For example, the NAS message may indicate a 5QI which may indicate a first QoS requirements that the UE requests. For example, the NAS message may comprise a second 5QI which may indicate a QoS parameters that the SMF accepts and/or which the network provides to the UE.

Figure 22:
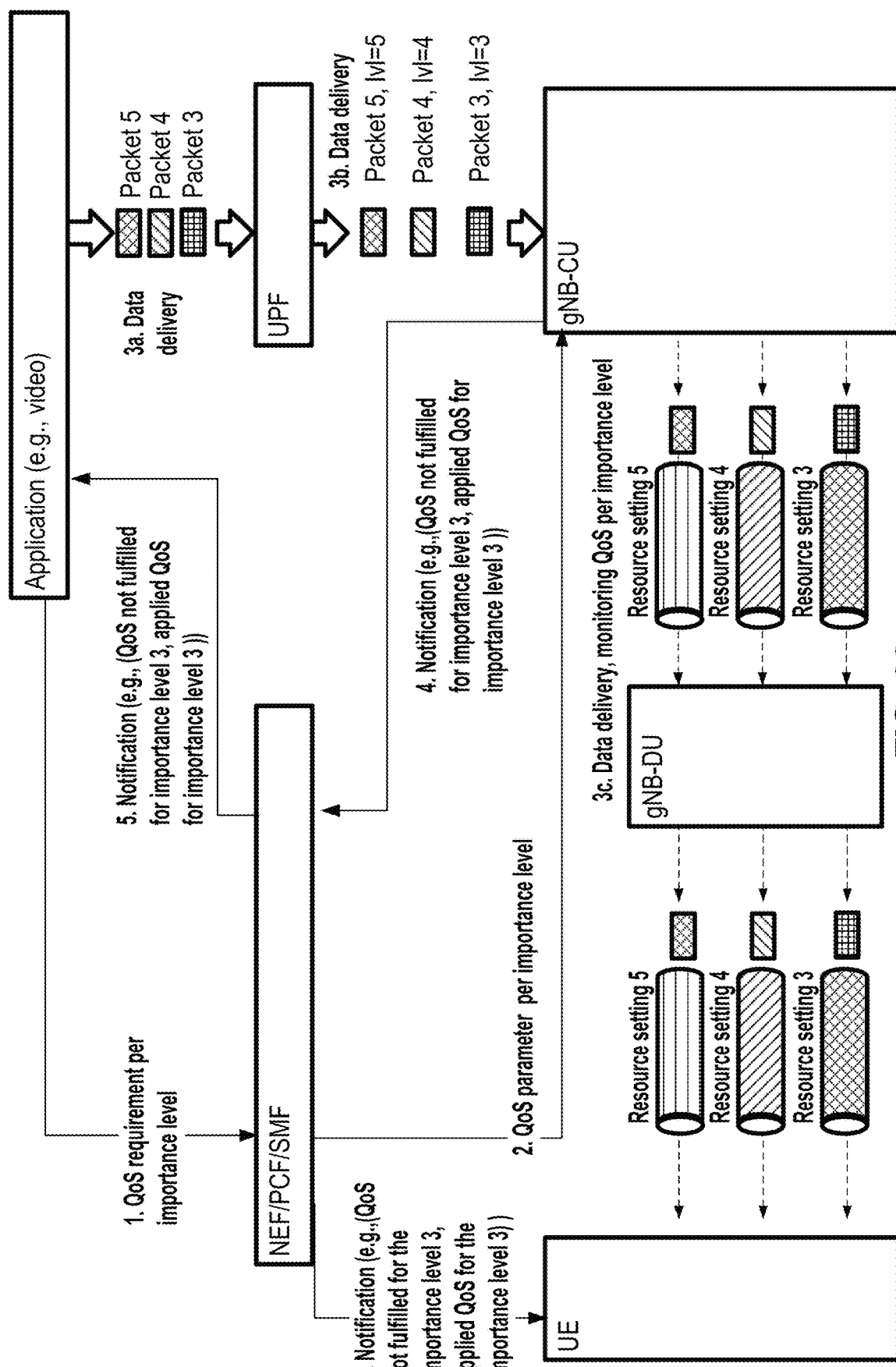
FIG. 22 is a diagram of an aspect of an example embodiment of the present disclosure.

FIG. 22 may depict one example embodiment of the present disclosure. A SMF and/or a NG-RAN may monitor whether QoS requirements is met per importance level of one or more PDU sets. This may assist to support different QoS, based on the importance level, for one or more PDUs of one or more PDU sets for a flow. For brevity, redundant details will be omitted.

In an example, the AF may send to the NEF, the Nnef service request. The Nnef service request message may comprise at least one of:

AF identifier.

UE address.

QoS information: This may be at least one of a QoS reference, alternative service (QoS) requirements, QoS parameters to be measured, individual QoS parameters, and/or alternative QoS related parameter sets. This may indicate a specific QoS (requirement) that the AF requests for the one or more PDU sets. The one or more PDU sets may comprise one or more PDU set types. For example, the one or more PDU set types may comprise a third PDU set type and/or a fourth PDU set type. For example, the third PDU set type may have a high priority (e.g., value 0, 1, and/or the like). For example, the fourth PDU set type may have a low priority (e.g., value 10, 11, and/or the like). The third PDU set type may comprise one or more third PDU sets. The fourth PDU set type may comprise one or more fourth PDU sets. The QoS information may comprise one or more QoS information items. For example, the one or more QoS information items may comprise a third QoS information item (a third QoS information) and/or a fourth QoS information item (a fourth QoS information). The third QoS information item may be for the third PDU set type and/or for one or more PDU sets of a third importance level (e.g., high). The fourth QoS information item may be for the fourth PDU set type and/or for one or more PDU sets of fourth importance level (e.g., low). The importance level (and/or the like) may indicate for each PDU of a service flow (e.g., IP flow, QoS flow, application data flow, and/or the like), a priority (and/or importance) level of the PDU. For example, in case of video application, the application may generate I frame, B frame and/or P frame. I frame may be played/used alone while the B/P frame may not be played/used alone without an I frame associated with the B/P frame. For example, I frame may be more important than the B/P frame. The I/B/P frame may share some characteristics. For example, the characteristics may include a same source IP address, a same destination IP address. Thus, by extracting (deriving) the importance level of the each PDU, and/or by delivering information of the importance level to one or more network nodes, more efficient processing may be achieved. For example, higher reliability may be provided to the I frame.

In an example, the NEF may receive the Nnef service request message. The NEF may send the first Npcf service request messages to the PCF. The PCF may receive the first Npcf service request message. The PCF may send the second Npcf service request message to the SMF. The SMF may receive the second Npcf service request message.

In an example, based on the information of the second Npcf service request message, the SMF may update/modify the PDU session for the UE, may send the first N2 SM container to the NG-RAN. The first N2 SM container may comprise at least one of:

PDU session aggregation maximum bit rate.

UL NG-U UP TNL information.

QoS flow list.

In an example, the QoS flow request item of the one or more QoS flow request items may comprise at least one of:

QoS flow identifier.

QoS flow level QoS parameter.

Importance level. This may be an identifier (e.g., 1, 2, 3, high, low) indicating an importance level.

Importance level QoS parameter. This may indicate one or more QoS parameters for one or more PDUs (or PDU sets) associated with the importance level.

In an example, the NG-RAN may receive the first N2 SM container. Based on the N2 SM container, the NG-RAN may configure one or more bearers with the UE. For example, based on one or more importance level QoS parameter, the NG-RAN may use one or more resource setting (configuration). For example, the NG-RAN may configure a third resource setting (e.g., resource setting 3, PHY/MAC/RLC/PDCP setting 3, 3 HARQ retransmission) for the third type of PDU set. For example, the NG-RAN may configure a fourth resource setting (resource setting 4, PHY/MAC/RLC/PDCP setting 4, 1 HARQ retransmission) for the fourth type of PDU set.

In an example, an AF and/or the UE may exchange one or more PDUs (e.g., data packets, packets, ADUs, and/or the like). The one or more PDUs may comprise one or more PDU sets. The one or more PDUs sets may comprise the one or more third PDU sets (e.g., for third importance level) and/or one or more fourth PDU sets. (e.g., for fourth importance level). For example, the one or more PDUs may comprise a third PDU (packet 3) and/or a fourth PDU (packet 4). The one or more third PDU sets may comprise the third PDU. The one or more fourth PDU sets may comprise the fourth PDU.

In an example, a UPF may receive the one or more PDUs sent by the AF. The UPF may send the one or more PDUs to the NG-RAN, with one or more information of importance level. For example, the UPF may send to the NG-RAN, the third PDU with the information of the third importance level. For example, the UPF may send to the NG-RAN, the fourth PDU with the information of the fourth importance level.

In an example, the NG-RAN may receive the one or more PDUs with information of the importance level. The NG-RAN may try to deliver the one or more PDUs, using one or more resources settings. For example, for the third PDU, based on the third importance level, the NG-RAN may use the third resource setting. For example, for the fourth PDU, based on the fourth importance level, the NG-RAN may use the fourth resource setting.

In an example, the NG-RAN may comprise a gNB-DU and/or a gNB-CU. In this case, the gNB-CU may send to the gNB-DU, the one or more PDUs with the importance level information. For example, as shown in the FIG. 23, gNB-CU may send a F1 message to the gNB-DU. For example, the F1 message may comprise at least one of the QoS flow list, the QoS flow level QoS parameter, the one or more QoS flow request items, one or more information of the resource settings and/or the like. For example, based on the F1 message, the gNB-DU may monitor whether the QoS requirements for the one or more PDU sets per importance level are fulfilled or not. For example, when the QoS requirements for the one or more PDU sets are not fulfilled, the gNB-DU may send a F1 notification to the gNB-CU. The F1 notification may indicate that the QoS requirements for the one or more PDU sets per importance level are fulfilled or not fulfilled.

In an example, reverting to FIG. 22, the NG-RAN may monitor (or calculate, determine, measure, and/or the like) whether the QoS requirement is met for one or more PDU sets of one or more importance level. For example, the NG-RAN may determine whether the QoS requirement of the third QoS information is not fulfilled for the third PDU sets of the third importance level. For example, the NG-RAN may determine whether the QoS requirement of the fourth QoS information is fulfilled for the fourth PDU sets of the fourth importance level.

In an example, the NG-RAN may determine, based on the third QoS information, that the QoS is not fulfilled for the third PDU sets (or for the third importance level).

In an example, based on the determination, the NG-RAN may send the third N2 SM container. For example, the third N2 SM container may indicate that QoS requirement (indicated by the third QoS information) for the importance level (e.g., the third importance level, or the third PDU set type) is not met (fulfilled) and/or that the NG-RAN can currently fulfill one of the one or more alternative QoS parameters set for the third importance level (for the third PDU set type). For example, the NG-RAN may send the third N2 SM container if the NG-RAN is requested to send a notification by the SMF.

In an example, the SMF may receive the third N2 SM container sent by the NG-RAN. Based on the third N2 SM container, the SMF may determine whether the QoS requirement for the one or more importance level (e.g., the third importance level) is met (fulfilled) or not. For example, the SMF may receive the third N2 SM container which indicates that QoS requirement for one or more importance level (e.g., the third importance level, the third PDU set type) is not met (fulfilled), that alternative QoS requirement one (e.g., the first alternative QoS parameters set) is fulfilled for the third importance level (e.g., the third PDU set type), and/or that the NG-RAN currently provides the first alternative QoS parameters set (e.g., the first alternative QoS index). Based on the third N2 SM container, the SMF may determine that PDU set importance level QoS requirement is not met (fulfilled), and/or that the first alternative QoS parameters set is currently fulfilled for the third importance level, and/or the like.

In an example, the SMF may send the notification to the PCF, the PCF may send the notification to the NEF, and/or the NEF may send the notification to the AF.

In an example, based on the third N2 SM container, the SMF may send the NAS message to the UE. For example, The NAS message may inform the UE about the change in the QoS parameters for the one or more importance level. For example, the change in the QoS parameter may be a change in the PER, PDB, PSER, and/or a change in the PSDB, for the importance level (for example, for the importance level 3, for the PDU set type 3). For example, the NAS message may indicate the QoS (e.g., PER, PBR, PSER, PSDB) that the NG-RAN currently fulfills for the QoS flow transporting the one or more importance level, and/or for the importance level (the importance level 3, for the PDU set type 3). For example, the NAS message may indicate that QoS (e.g., PDB, PBR, PSER, PSDB) is not fulfilled for the one or more importance level.

Figure 24:
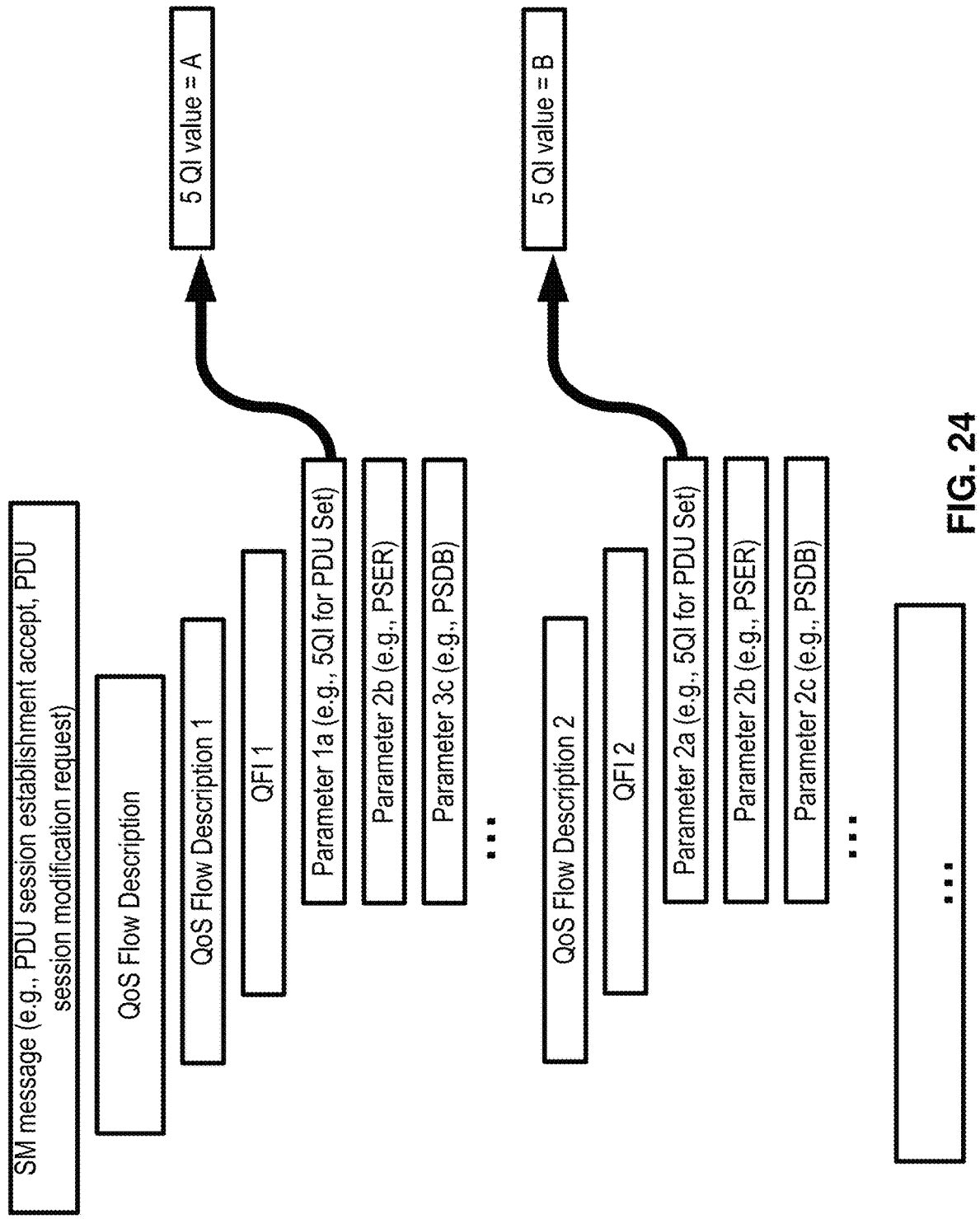
FIG. 24 is a diagram of an aspect of an example embodiment of the present disclosure.

FIG. 24 may depict one example embodiment of the present disclosure. A SM message may be used to exchange QoS related information between a UE and a network.

For example, the SM message may be a PDU session establishment request/accept message, a PDU session modification command/request/accept message, and/or the like. For example, the SM message may comprise one or more QoS Flow descriptions. A QoS flow description of the one or more QoS flow descriptions may comprise a QoS flow identifier (QFI). The QoS flow identifier may be associated with one or more QoS parameters. The one or more QoS parameters may comprise at least one of a 5QI, a PSER, a PSDB. For example, the 5QI may indicate a specific combination of QoS parameters (e.g., PDB, PER, PSDB, and/or PSER)

Figure 25:
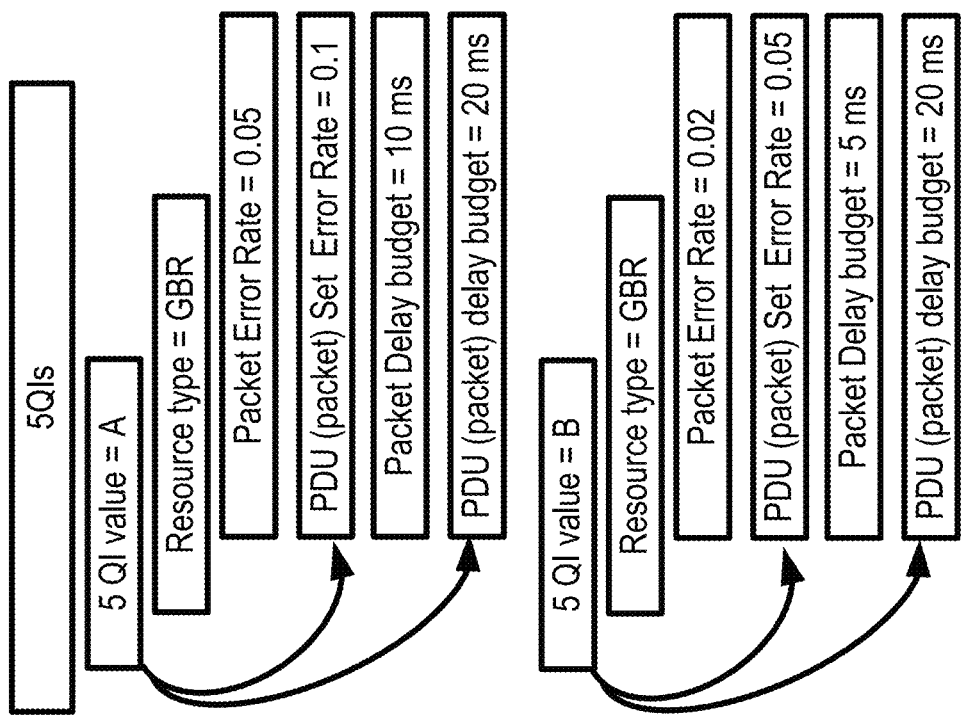
FIG. 25 is a diagram of an aspect of an example embodiment of the present disclosure.

FIG. 25 may depict one example embodiment of the present disclosure.

In an example, a 5QI of one or more 5QIs may comprise an index for the 5QI (e.g., 0, 1, 2, 11, and/or the like) and/or one or more QoS parameters (e.g., QoS characteristics, QoS profile and/or the like). The index for the 5QI may indicate a specific set of the one or more QoS parameters. The one or more QoS parameters may comprise a resource type, a default priority level, a packet delay budget (PDB), a packet error rate (PER), a maximum data burst volume, an averaging window, a PSER, a PSDB.

Figure 27:
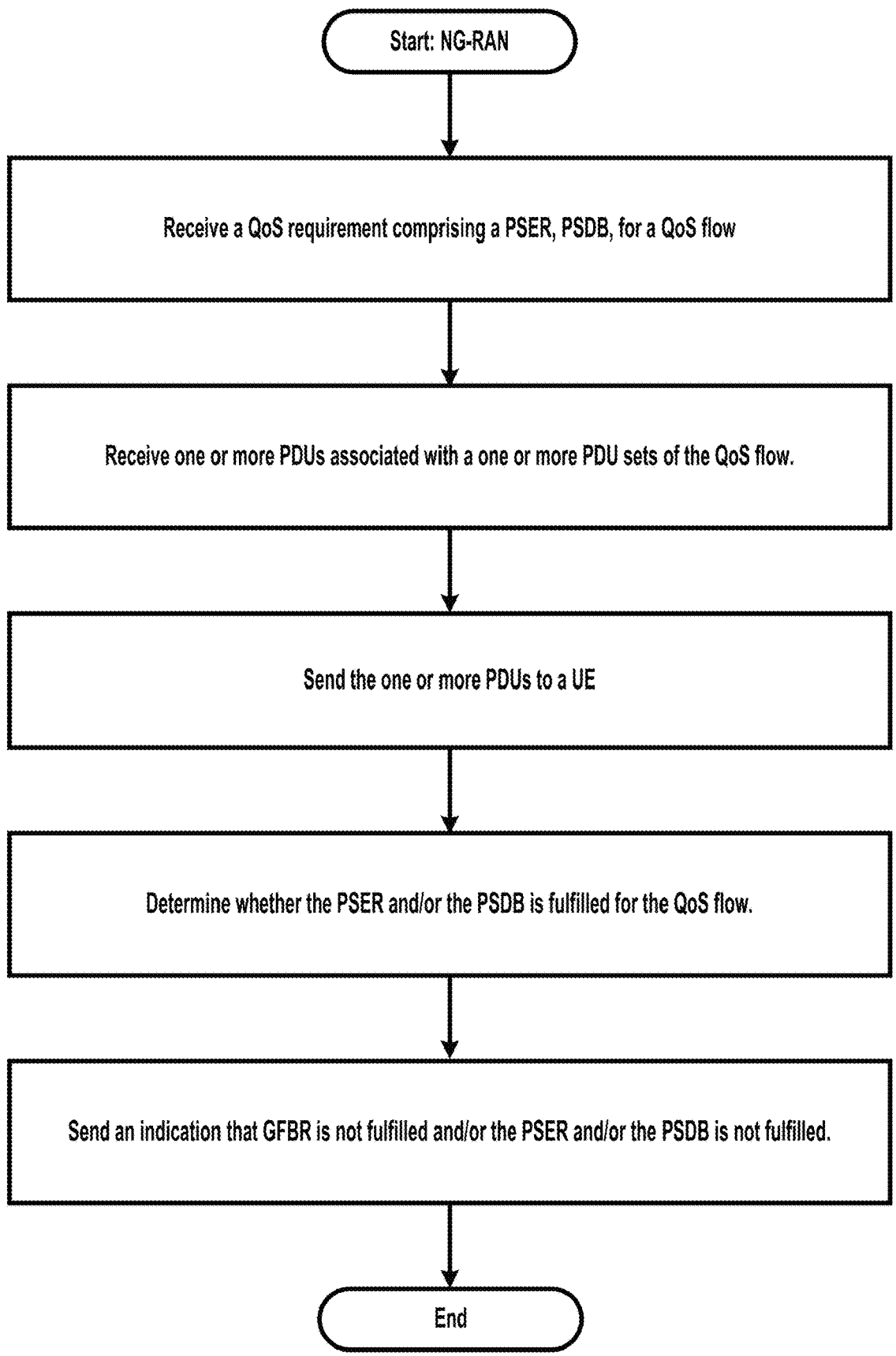
FIG. 27 is a diagram of an aspect of an example embodiment of the present disclosure.

FIG. 27 may depict one example embodiment of the present disclosure.

In an example, a NG-RAN may receive from a SMF, a QoS requirement (e.g., QoS parameters set, QoS profile, and/or the like) for a QoS flow. The QoS flow may comprise one or more PDU sets. The one or more PDU sets may comprise one or more PDUs. The QoS requirement may comprise a 5QI and/or one or more QoS parameters. The QoS requirement may comprise a GFBR, a PSER and/or a PSDB.

In an example, the NG-RAN may receive from a UPF, the one or more PDUs of the one or more PDU sets.

In an example, the NG-RAN may communicate with the UE, the one or more PDUs of the one or more PDU sets.

In an example, the NG-RAN may determine (measure, calculate, monitor) current QoS provided to the UE. For example, based on achieved (provided, fulfilled) QoS (e.g., PSER, PSDB) for the one or more PDU sets, the NG-RAN may determine whether the QoS requirement is met or not for the UE.

In an example, based on the determination, the NG-RAN may send a notification (indication) to the SMF. For example, the notification may indicate that a GFBR for the QoS flow is not fulfilled, and/or that the PSDB and/or the PSER for the QoS flow (of the one or more PDU sets) is not met (fulfilled).

Figure 28:
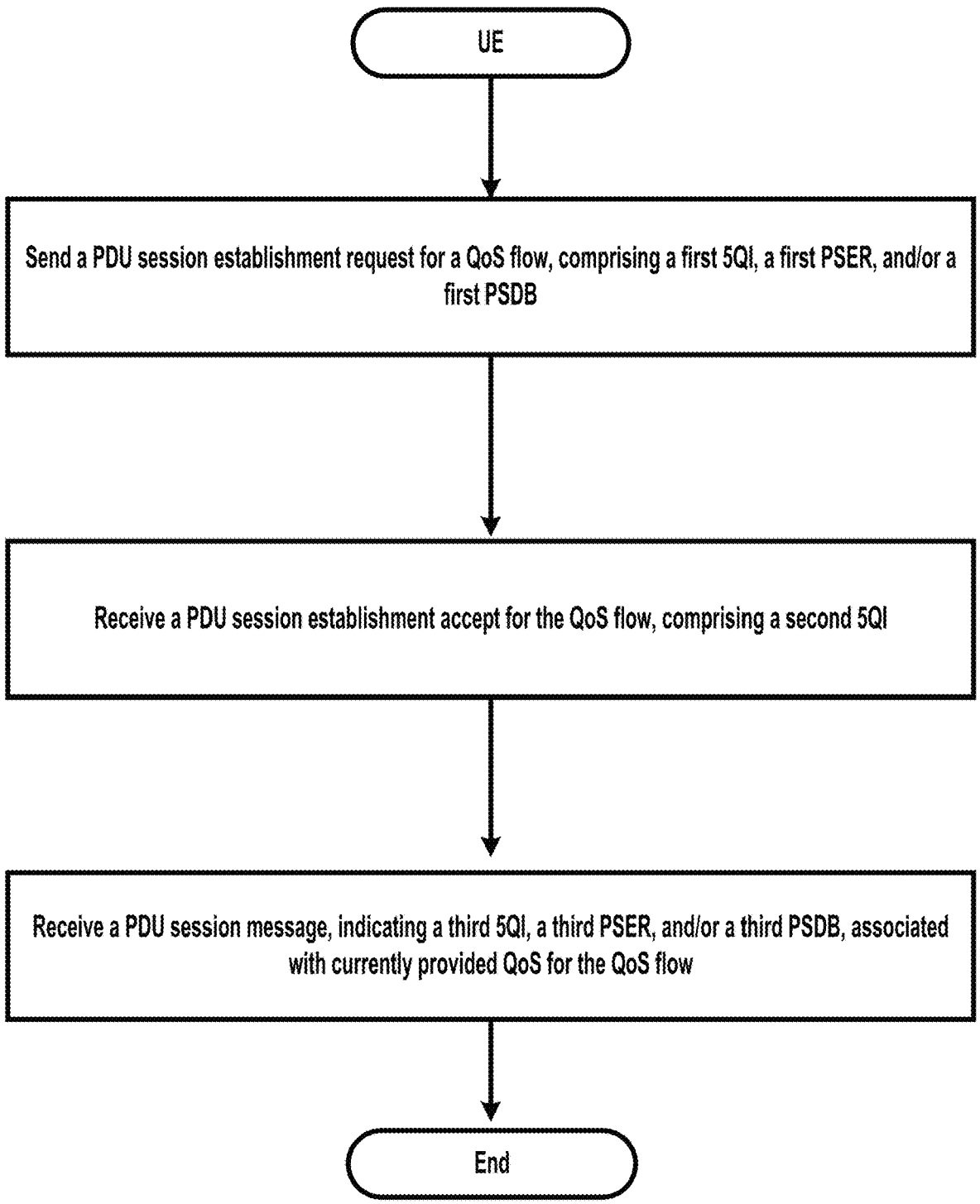
FIG. 28 is a diagram of an aspect of an example embodiment of the present disclosure.

FIG. 28 may depict one example embodiment of the present disclosure.

In an example, a UE may send a first NAS message to a SMF. The first NAS message may comprise a QoS requirement (e.g., QoS parameters set, QoS profile, and/or the like) for a QoS flow. The QoS flow may comprise one or more PDU sets. The one or more PDU sets may comprise one or more PDUs. The QoS requirement may comprise at least one of a first 5QI, a first PSER, a first PSDB for the QoS flow. For example, the first 5QI may indicate the first PSER and/or the first PSDB. For example, the first NAS message may be a PDU session establishment request, a PDU session modification request, and/or the like.

In an example, the UE may receive a second NAS message from the SMF. The second NAS message may be a PDU session establishment accept, a PDU session modification accept, a PDU session modification command, and/or the like. The second NAS message may comprise at least one of a second 5QI, a second PSER, and/or a second PSDB. For example, the second 5QI may indicate the second PSER and/or the second PSDB. For example, the second NAS message may indicate QoS accepted/configured by the SMF for the QoS flow.

In an example, the UE may receive a third NAS message from the SMF. The third NAS message may be a second PDU session modification accept, a second PDU session modification command, a status message, and/or the like. The third NAS message may comprise at least one of a third 5QI, a third PSER, and/or a third PSDB. For example, the third 5QI may comprise the third PSER and/or the third PSDB. For example, the third NAS message may indicate QoS that is currently achieved/provided/fulfilled by a network (e.g., a NG-RAN, a UPF, and/or the like).

In an example, a NG-RAN (e.g., base station, gNB, gNB-CU, gNB-DU) may receive from a core network node (e.g., a SMF, an AMF), a request message for a UE. The request message may request the NG-RAN to establish a quality of service (QoS) flow. The QoS flow may comprise one or more protocol data unit (PDU) sets. The QoS flow may be a guaranteed bit rate (GBR) flow. The one or more PDU sets may comprise one or more PDUs. A PDU set of the one or more PDU set may comprise at least one PDU of the one or more PDUs. For example, the request message may comprise a QoS requirement (e.g., QoS profile, QoS parameters, QoS parameters set, and/or the like). The QoS requirement may comprise at least one of a first value (e.g., a target PSER) for a PDU set error rate (PSER) for the QoS flow (or the one or more PDU sets) and/or a second value (e.g., a target PSDB) for a PDU set delay budget (PSDB) for the QoS flow (or the one or more PDU sets). For example, the request message may be a PDU session resource setup request, a PDU session resource modify request, and/or the like In an example, the PSER may indicate a ratio of a first number to a second number. The first number may be a number of one or more first PDU sets not successfully delivered (e.g., from the UE to the NG-RAN and/or from the NG-RAN to the UE). For example, a PDU set of the one or more PDU sets may not be successfully delivered if at least one or more PDUs of the PDU set is not delivered. For example, the PDU of the one or more PDUs may be considered (counted) as not being delivered, if the PDU is not delivered with a time period. For example, the time period may be associated with a PDB and/or the PSDB. For example, the PDU not delivered may be discarded (removed) from a buffer of a sender, if the time period expires. The second number may be a number of one or more second PDU sets that the NG-RAN needs to communicate with the UE. For example, if the PDU is not delivered to a receiver (e.g., the UE and/or the NG-RAN) in the time period, the PDU may be determined to be not delivered to the receiver. For example, if a sender (e.g., the NG-RAN and/or the UE) stops transmission of the PDU (e.g., without receiving acknowledgement), the PDU may be determined to be not delivered to the receiver. For example, the sender may stop transmission of the PDU, if a number of the transmission of the PDU exceeds a threshold.

In an example, the PSDB may indicate an allowed delay between a network (e.g., the UPF) and the UE, to deliver all PDUs of a PDU set. For example, the sender may not transmit (or stop transmission) the one or more PDUs of the PDU set, if the one or more PDUs are not delivered to the UE with the PSDB.

In an example, the NG-RAN may communicate (e.g., receive, send) with the UE, the one or more PDUs of the one or more PDU sets. In an example, the NG-RAN may communicate with a second network node (e.g., a UPF, a second core network node), one or more PDUs of the one or more PDUs and/or one or more PDU sets of the one or more PDU sets.

In an example, the NG-RAN may determine whether the QoS requirement is fulfilled or not. In an example, the NG-RAN may determine whether the QoS requirement is not fulfilled or not. For example, based on communicating with the UE, the NG-RAN may determine whether the first value of the PSER and/or the second value of the PSDB is achieved/fulfilled or not. For example, based on communicating with the UE, the NG-RAN may measure (determine/ achieve/fulfill) a third value (achieved PSER, fulfilled PSER, current PSER, and/or the like) for the PSER. For example, based on communicating with the UE, the NG-RAN may measure (determine/achieve/fulfill) a fourth value (achieved PSDB, fulfilled PSDB, current PSDB, and/or the like) for the PSDB. For example, if the third value is higher/larger than the first value, the NG-RAN may determine that the QoS requirement (e.g., PSER requirement) is not met (fulfilled). For example, if the third value is lower/ smaller than the first value, the NG-RAN may determine that the QoS requirement (e.g., PSER requirement) is met (fulfilled). For example, if the fourth value is higher/larger than the first value, the NG-RAN may determine that the QoS requirement (e.g., PSDB requirement) is not met (fulfilled). For example, if the fourth value is lower/smaller than the first value, the NG-RAN may determine that the QoS requirement (e.g., PSDB requirement) is not met (fulfilled). For example, a value H1 (e.g., 1, 2, 3) is lower/smaller than a value H2 (e.g., 4, 5, 6). For example, a value J1 (e.g., 2) is higher/larger than a value J2 (e.g., 1).

In an example, the NG-RAN may send a report message to the core network node. For example, the report message may indicate that the QoS requirement is not met (fulfilled). For example, the report message may comprise a PDU session resource notify. For example, that the QoS requirement is not fulfilled may be that the QoS flow (of the one or more PDU sets, or for PDU set) is not fulfilled. For example, that the QoS flow is not fulfilled may be that a guaranteed flow bit rate (GFBR) (for the GBR flow, the QoS flow, the one or more PDU sets) is not fulfilled (met).

In an example, a first network node (e.g., SMF) may receive from a second network node (e.g., PCF, NEF), a policy and charging control (PCC) rule for a QoS flow comprising one or more packet data unit (PDU) sets. The PCC rule may comprise at least one of a guaranteed flow bit rate (GFBR), a PDU set error rate (PSER), or a PDU set delay budget (PSDB). The first network node may send to a base station, a first message comprising quality of service (QoS) requirement for the QoS flow. The QoS requirement comprises at least one of the GFBR, the PSER and the PSDB. The first network node may receive from the base station, a second message indicating that the GFBR is not fulfilled. The first network node may send to the second network node and based on the second message, a notification that the GFBR is no longer guaranteed.

In an example, a base station may receive from a core network node, a first message comprising quality of service (QoS) requirement for a QoS flow comprising one or more PDU sets. The QoS requirement comprises at least one of a first value for a PDU set error rate (PSER) and a second value for a PDU set delay budget (PSDB). The base station may send to the core network node, a second message indicating that the QoS flow (or a GFBR) is not fulfilled (met).

In an example, a base station may receive from a core network node, a first message comprising an alternative quality of service (QoS) parameters sets (lists) for a QoS flow comprising one or more PDU sets. The alternative QoS parameters sets may comprise at least one of one or more first values for a PDU set error rate (PSER) and one or more second values for a PDU set delay budget (PSDB). The base station may determine, an alternative QoS parameters set of the alternative QoS parameter sets (lists). The base station may fulfill the alternative QoS parameters set for a wireless device. The base station may send to the core network node, a second message comprising an index of the alternative QoS parameters set.

In an example, a gNB-DU may receive from a gNB-CU, a first message indicating quality of service (QoS) requirement for a QoS flow comprising one or more PDU set types, wherein the QoS requirement comprises at least one of a first QoS requirement for a first PDU set type and a second QoS requirement for a second PDU set type. The gNB-DU may receive, at least one of a first PDU (set) of the first PDU set type and a second PDU (set) of the second PDU set type. The gNB-DU may send (communicate with) to the UE, at least one of the first PDU with the first Qos requirement and the second PDU with the second QoS requirement.

In an example, a gNB-DU may receive from a gNB-CU, a first message indicating quality of service (QoS) requirement for a QoS flow comprising one or more PDU set types. The QoS requirement comprises at least one of a first QoS requirement for a first PDU set type and a second QoS requirement for a second PDU set type. The gNB-DU may determine whether the first QoS requirement for the first PDU set type is not fulfilled. The gNB-DU may send to the gNB-CU, that the first QoS requirement for the first PDU set type is not fulfilled.

In an example, a UE may send to a network node, a request message comprising a first 5G quality of service identifier (5QI) for a QoS flow comprising one or more PDU sets. The 5QI may indicate at least one of a first value for a PDU set error rate (PSER) and a second value for a PDU set delay budget (PSDB). The wireless device may receive from the network node, a response message comprising a second 5QI.

In some aspects, the techniques described herein relate to a method including: receiving, by a gNB-DU from a gNB-CU, a first message indicating quality of service (QoS) requirement for a data flow including one or more PDU set types, wherein the QoS requirement includes at least one of: —a first QoS requirement for a first PDU set type; and—a second QoS requirement for a second PDU set type; receiving, by the gNB-DU, at least one of a first PDU of the first PDU set type and a second PDU of the second PDU set type.

In some aspects, the techniques described herein relate to a method, further including sending, by the gNB-DU to the wireless device, at least one of the first PDU with the first QoS requirement and the second PDU with the second QoS requirement.

In some aspects, the techniques described herein relate to a method including: sending, by a gNB-CU from a gNB-DU, a first message indicating quality of service (QoS) requirement for a data flow including one or more PDU set types, wherein the QoS requirement includes at least one of: —a first QoS requirement for a first PDU set type; and—a second QoS requirement for a second PDU set type; sending, by the gNB-CU, at least one of a first PDU of the first PDU set type and a second PDU of the second PDU set type;

In some aspects, the techniques described herein relate to a method including: receiving, by a gNB-DU from a gNB-CU, a first message indicating quality of service (QoS) requirement for a data flow including one or more PDU set types, wherein the QoS requirement includes at least one of: —a first QoS requirement for a first PDU set type; and—a second QoS requirement for a second PDU set type; determining, by the gNB-DU, whether the first QoS requirement for the first PDU set type is not fulfilled; and sending, by the gNB-DU to the gNB-CU, that the first QoS requirement for the first PDU set type is not fulfilled.

In some aspects, the techniques described herein relate to a method including: receiving, by a first node from a second node, a first message indicating quality of service (QoS) requirement for a data flow including one or more PDU sets, wherein the QoS requirement includes at least one of: —a first QoS requirement for one or more first PDU sets of a first importance; and—a second QoS requirement for one or more second PDU sets of a second importance; and sending, by the first node: —a first PDU with the first QoS requirement, based on that the first PDU is a PDU of the one or more first PDU sets; and—a second PDU with the second QoS requirement, based on that the second PDU is a PDU of the one or more second PDU sets.

In some aspects, the techniques described herein relate to a method including: receiving, by a first node from a second node, a first message indicating quality of service (QoS) requirement for a data flow including one or more protocol data unit (PDU) sets, wherein the QoS requirement includes at least one of: —a first QoS requirement for one or more first PDU sets of a first importance; and—a second QoS requirement for one or more second PDU sets of a second importance; and sending, by the first node to the second node: —an indication that the data flow is fulfilled for the first importance, in response to that the first QoS requirement is met for the one or more first PDU sets.

In some aspects, the techniques described herein relate to a method including: sending, by a base station (BS)-central unit (CU) to a base station (BS)-distribute unit (DU), a message requesting a report indicating whether a data flow is fulfilled for a first importance, wherein the data flow includes at least one or more first PDU sets of the first importance and one or more second PDU sets of a second importance.

In some aspects, the techniques described herein relate to a method including: sending, by a base station (BS)-distribute unit (DU) to a base station (BS)-central unit (CU) to, a report message indicating whether a data flow is fulfilled for a first importance, wherein the data flow includes at least one or more first PDU sets of the first importance and one or more second PDU sets of a second importance.

In some aspects, the techniques described herein relate to a method including: receiving, by a first node from a second node, a first message indicating quality of service (QoS) requirement for a data flow including one or more protocol data unit (PDU) sets, wherein the QoS requirement includes at least one of: —a first QoS requirement for one or more first PDU sets of a first importance; and—a second QoS requirement for one or more second PDU sets of a second importance; and sending, by the first node to the second node: —an indication that the data flow is fulfilled for the first importance, in response to that the first QoS requirement is met for the one or more first PDU sets.

In some aspects, the techniques described herein relate to a method including: sending, by a wireless device to a network node (e.g., SMF), an establishment request message for a protocol data unit (PDU) session including a data flow, wherein the data flow includes one or more PDU sets of a first importance; and receiving, by the wireless device from the network node, an indication that the data flow is not fulfilled for the first importance.

In some aspects, the techniques described herein relate to a method including: receiving, by a network node (e.g., NEF) from an application server, a quality of service (QoS) information for a data flow including at least one or more first PDU sets of a first importance and one or more second PDU sets of a second importance; and sending, by the network node, an indication that the data flow is not fulfilled for the first importance.

In some aspects, the techniques described herein relate to a method including: receiving, by a second network node (e.g., SMF) from a base station, an indication that the data flow is not fulfilled for a first importance, wherein the data flow includes at least one or more first PDU sets of the first importance and one or more second PDU sets of a second importance; and sending, by the second network node to a network node, an indication that the data flow is not fulfilled for the first importance.

In some aspects, the techniques described herein relate to a method including: sending, by a wireless device to a network node, a protocol data unit (PDU) session request message including a first 5G quality of service identifier (5QI) for a data flow including one or more PDU sets, wherein the first 5QI indicates at least one of: —a first value for a PDU set error rate (PSER); and—a second value for a PDU set delay budget (PSDB); and receiving, by the wireless device from the network node, a PDU session response message including a second 5QI allowed for the PDU session, wherein the second 5 QI indicates at least one of: —a third value for the PSER; and—a fourth value for the PSDB.

In some aspects, the techniques described herein relate to a method including: sending, by a wireless device to a network node, a protocol data unit (PDU) session request message including a first 5G quality of service identifier (5QI) for a data flow including one or more PDU sets, wherein the first 5QI indicates at least one of: —a first value for a PDU set error rate (PSER); and—a second value for a PDU set delay budget (PSDB).

In some aspects, the techniques described herein relate to a method including: receiving, by a wireless device from a network node, a protocol data unit (PDU) session response message including a second 5G quality of service identifier (5QI) allowed for the PDU session, wherein the second 5QI indicates at least one of: —a third value for a PDU set error rate (PSER); and—a fourth value for a PDU set delay budget (PSDB).

In some aspects, the techniques described herein relate to a method including: receiving, by a session management function (SMF) to a wireless device, a protocol data unit (PDU) session request message for a data flow including one or more PDU sets; and sending, by the SMF, a PDU session response message including alternative QoS parameter set lists, wherein each of the alternative parameter set list indicates a 5G quality of service identifier (5QI) for the data flow, wherein the 5QI indicates at least one of: —a third value for a PDU set error rate (PSER); and—a fourth value for a PDU set delay budget (PSDB); and In some aspects, the techniques described herein relate to a method including: sending, by a wireless device to a session management function (SMF), a protocol data unit (PDU) session request message for a data flow including one or more PDU sets; and receiving, by the wireless device, a PDU session response message including alternative QoS parameter set lists, wherein each of the alternative parameter set list indicates a 5G quality of service identifier (5QI) for the data flow, wherein the 5QI indicates at least one of: —a third value for a PDU set error rate (PSER); and—a fourth value for a PDU set delay budget (PSDB); and In some aspects, the techniques described herein relate to a method including: receiving, by a core network, a request message including: an alternative QoS parameter set lists, wherein each alternative QoS parameter set of the alternative QoS parameter set lists includes at least one of: an index of the each alternative QoS parameter set; a value for PSER; and a value for PSDB; and sending, by the core network, a request message including the alternative QoS parameter set list.

In some aspects, the techniques described herein relate to a method including: sending, by a core network, a request message including: an alternative QoS parameter set lists, wherein each alternative QoS parameter set of the alternative QoS parameter set lists includes at least one of: an index of the each alternative QoS parameter set; a value for PSER; and a value for PSDB.

In some aspects, the techniques described herein relate to a method including: receiving, by a core network, a first report message of a data flow including a plurality of protocol data unit (PDU) sets, wherein the report message indicates at least one of: the data flow not being fulfilled; and a fulfilled alternative QoS parameter set indicating at least one of a PDU set error rate (PSER) and a PDU set delay budget (PSDB); sending, by the core network, a second report message indicating at least one of: the data flow not being fulfilled; and the fulfilled alternative QoS parameter set.

In some aspects, the techniques described herein relate to a method including: sending, by a core network, a report message of a data flow including a plurality of protocol data unit (PDU) sets, wherein the report message indicates at least one of: the data flow not being fulfilled; and a fulfilled alternative QoS parameter set indicating at least one of a PDU set error rate (PSER) and a PDU set delay budget (PSDB).

In some aspects, the techniques described herein relate to a method including: receiving, by a wireless device, a report message of a data flow including a plurality of protocol data unit (PDU) sets, wherein the report message indicates at least one of: the data flow not being fulfilled; and a fulfilled alternative QoS parameter set indicating at least one of a PDU set error rate (PSER) and a PDU set delay budget (PSDB).

The invention claimed is:

1. A method comprising:
receiving, by a base station distributed unit (BS-DU) from a base station central unit (BS-CU), a message requesting a quality of service (QOS) flow, wherein:
the QoS flow comprises a plurality of protocol data unit (PDU) sets associated with a respective plurality of data units of an application;
each PDU set comprises one or more PDUs of a respective data unit; and
the message comprises:
QoS parameters indicating a packet error rate (PER) and a packet delay budget (PDB) for the QoS flow; and
one or more alternative QoS parameter sets, each alternative QoS parameter set comprising an alternative PDU set error rate (PSER) and an alternative PDU set delay budget (PSDB);
sending, by the BS-DU to the BS-CU, a second message indicating at least one of:
a QoS of the QoS flow not being fulfilled; or
a fulfilled alternative QoS parameter set indicating a fulfilled PSER and a fulfilled PSDB.

2. The method of claim 1, further comprising receiving, by the BS-DU from the BS-CU, the one or more PDUs with one or more importance level information.

3. The method of claim 1, further comprising communicating, by the BS-DU with a wireless device and based on the one or more importance level information, the one or more PDUs.

4. The method of claim 1, wherein the second message comprises an index of the fulfilled alternative QoS parameter set.

5. The method of claim 1, further comprising determining, by the BS-DU and based on the first message, whether the QoS of the QoS flow is fulfilled.

6. The method of claim 1, further comprising determining, by the BS-DU and based on the first message, which alternative QoS parameter set of the one or more alternative QoS parameter sets is fulfilled.

7. The method of claim 1, further comprising measuring, by the BS-DU, at least one of a third value for the PSER and a fourth value for the PSDB.

8. A base station distributed unit (BS-DU) comprising one or more processors and memory storing instructions that, when executed by the one or more processors, cause the BS-DU to:
receiving, by a base station distributed unit (BS-DU) from a base station central unit (BS-CU), a message requesting a quality of service (QOS) flow, wherein:
the QoS flow comprises a plurality of protocol data unit (PDU) sets associated with a respective plurality of data units of an application;
each PDU set comprises one or more PDUs of a respective data unit; and
the message comprises:
QoS parameters indicating a packet error rate (PER) and a packet delay budget (PDB) for the QoS flow; and
one or more alternative QoS parameter sets, each alternative QoS parameter set comprising an alternative PDU set error rate (PSER) and an alternative PDU set delay budget (PSDB);
sending, by the BS-DU to the BS-CU, a second message indicating at least one of:
a QoS of the QoS flow not being fulfilled; or
a fulfilled alternative QoS parameter set indicating a fulfilled PSER and a fulfilled PSDB.

9. The BS-DU of claim 8, wherein the instructions further cause the BS-DU to receive, from the BS-CU, the one or more PDUs with one or more importance level information.

10. The BS-DU of claim 8, wherein the instructions further cause the BS-DU to communicate, with a wireless device and based on the one or more importance level information, the one or more PDUs.

11. The BS-DU of claim 8, wherein the second message comprises an index of the fulfilled alternative QoS parameter set.

12. The BS-DU of claim 8, wherein the instructions further cause the BS-DU to determine, based on the first message, whether the QoS of the QoS flow is fulfilled.

13. The BS-DU of claim 8, wherein the instructions further cause the BS-DU to determine, based on the first message, which alternative QoS parameter set of the one or more alternative QoS parameter sets is fulfilled.

14. The BS-DU of claim 8, wherein the instructions further cause the BS-DU to measure at least one of a third value for the PSER and a fourth value for the PSDB.

15. A method comprising:
sending, by a wireless device to a session management function (SMF), a protocol data unit (PDU) session message requesting a quality of service (QOS) flow of the wireless device, wherein:
the QoS flow comprises a plurality of protocol data unit (PDU) sets associated with a respective plurality of data units of an application;
each PDU set comprises one or more PDUs of a respective data unit;
QoS parameters of the QoS flow indicate a packet error rate (PER) and a packet delay budget (PDB) for the QoS flow; and
the QoS flow is associated with one or more alternative QoS parameter sets, each alternative QoS parameter set comprising an alternative PDU set error rate (PSER) and an alternative PDU set delay budget (PSDB); and
receiving, by the wireless device from the SMF, a non-access stratum message comprising a 5G QoS indicator, of the QoS flow, associated with a fulfilled alternative QoS parameter set indicating a fulfilled PSER and a fulfilled PSDB.

16. The method of claim 15, wherein the data flow not being fulfilled comprises a QoS parameter of the data flow not being fulfilled.

17. The method of claim 15, wherein the data flow not being fulfilled comprises a guaranteed flow bit rate (GFBR) for the data flow being not met.

18. The method of claim 15, wherein each alternative QoS parameter set indicates an index of the alternative QoS parameter set.

19. The method of claim 15, wherein the PSER indicates a ratio of a number of one or more PDU sets not successfully communicated and a number of one or more PDU sets to be communicated.

20. The method of claim 15, wherein the PSDB indicates an allowed delay between a network and the wireless device to deliver all PDUs of a PDU set.

* * * * *